US010523317B2

(12) United States Patent
Masuda et al.

(10) Patent No.: US 10,523,317 B2
(45) Date of Patent: Dec. 31, 2019

(54) MEASUREMENT SYSTEM AND MEASUREMENT METHOD

(71) Applicants: SUMITOMO ELECTRIC INDUSTRIES, LTD., Osaka-shi, Osaka (JP); SEI Optifrontier Co., Ltd., Yokohama-shi, Kanagawa (JP); SUMITOMO ELECTRIC LIGHTWAVE CORP., Raleigh, NC (US)

(72) Inventors: Kazuya Masuda, Osaka (JP); Tomohiko Ueda, Osaka (JP); Tsuneari Ito, Osaka (JP); Kenichiro Otsuka, Osaka (JP); Yoshifumi Hishikawa, Yokohama (JP); Gouichi Fukumoto, Yokohama (JP); Tetsufumi Tsuzaki, Yokohama (JP); Toshiyuki Miyamoto, Yokohama (JP); Takashi Murakami, Yokohama (JP); Yoshiyuki Suetsugu, Osaka (JP); Takashi Kondo, Raleigh, NC (US)

(73) Assignees: SUMITOMO ELECTRIC INDUSTRIES, LTD., Osaka-shi, Osaka (JP); SEI Optifrontier Co., Ltd., Yokohama-shi, Kanagawa (JP); SUMITOMO ELECTRIC LIGHTWAVE CORP., Raleigh, NC (US)

( * ) Notice: Subject to any disclaimer, the term of this patent is extended or adjusted under 35 U.S.C. 154(b) by 0 days.

(21) Appl. No.: 16/000,098

(22) Filed: Jun. 5, 2018

(65) Prior Publication Data
US 2019/0372665 A1 Dec. 5, 2019

(51) Int. Cl.
H04B 10/079 (2013.01)
G01M 11/00 (2006.01)
(Continued)

(52) U.S. Cl.
CPC ... *H04B 10/07955* (2013.01); *G01M 11/3127* (2013.01); *G01M 11/3136* (2013.01);
(Continued)

(58) Field of Classification Search
CPC ............ H04B 10/07955; H04B 10/071; H04B 10/07957; G01M 11/3127; G01M 11/3136; G01M 11/3145; G02B 6/4467
(Continued)

(56) References Cited

U.S. PATENT DOCUMENTS

| 5,723,857 | A | * | 3/1998 | Underwood | ......... | G01M 11/085 |
| | | | | | | 250/227.14 |
| 5,774,605 | A | * | 6/1998 | Cohen | .................. | G02B 6/3504 |
| | | | | | | 385/134 |
| 6,369,883 | B1 | * | 4/2002 | Clark | ..................... | G01N 21/59 |
| | | | | | | 250/228 |
| 7,636,506 | B2 | * | 12/2009 | Fricker | ................ | G02B 6/4453 |
| | | | | | | 385/134 |

(Continued)

FOREIGN PATENT DOCUMENTS

JP H05-026763 A 2/1993
JP H10-153524 A 6/1998
(Continued)

*Primary Examiner* — Dalzid E Singh
(74) *Attorney, Agent, or Firm* — Drinker Biddle & Reath LLP

(57) ABSTRACT

A measurement system is a measurement system inspecting an optical transmission line configured by connecting a plurality of optical cables, each of which includes a plurality of optical fibers, wherein the optical transmission line includes a plurality of optical fiber lines configured by connecting the plurality of optical fibers in the plurality of optical cables, the measurement system including: a first measurement device configured to be disposed at a first end of the optical transmission line; and a second measurement device configured to be disposed at a second end of the optical transmission line, wherein the first measurement device and the second measurement device perform a first measurement to inspect whether the optical cable is misconnected, and a second measurement to inspect the plural-
(Continued)

ity of optical fiber lines in a case where it is determined that there is no misconnection in the first measurement.

13 Claims, 19 Drawing Sheets

(51) Int. Cl.
    *G02B 6/44*     (2006.01)
    *H04B 10/071*     (2013.01)
(52) U.S. Cl.
    CPC ....... *G01M 11/3145* (2013.01); *G02B 6/4467* (2013.01); *H04B 10/071* (2013.01); *H04B 10/07957* (2013.01)
(58) Field of Classification Search
    USPC .......................................................... 398/20
    See application file for complete search history.

(56) References Cited

U.S. PATENT DOCUMENTS

| | | | | |
|---|---|---|---|---|
| 2006/0198634 | A1* | 9/2006 | Ofalt | H04B 10/077 398/16 |
| 2007/0025676 | A1* | 2/2007 | Russell | G01M 11/3136 385/134 |
| 2013/0301036 | A1* | 11/2013 | Schillab | G01M 11/3154 356/73.1 |
| 2013/0343748 | A1* | 12/2013 | Benou | H04B 10/07957 398/29 |

FOREIGN PATENT DOCUMENTS

| | | |
|---|---|---|
| JP | H10-336106 A | 12/1998 |
| JP | 2000-295185 A | 10/2000 |
| JP | 2003-232701 A | 8/2003 |
| JP | 2007-33255 A | 2/2007 |

* cited by examiner

MEASUREMENT SYSTEM AND MEASUREMENT METHOD

TECHNICAL FIELD

The present disclosure relates to a measurement system and a measurement method.

BACKGROUND

Conventionally, there is known a system to inspect an optical cable which is laid between two points. For example, Japanese Unexamined Patent Publication No. H10-336106 and Japanese Unexamined Patent Publication No. 2000-295185 disclose a measurement device for inspecting an optical fiber by an OTDR (Optical Time Domain Reflectometer) method of emitting an optical pulse to one end of the optical fiber to measure a light returning to the one end by backward scattering and reflecting.

SUMMARY

In recent years, the number of optical fibers laid between two points is increased as a communication traffic is increased, and the introduction of a multiple core optical cable is ongoing. In a case where such an inspection of the optical cable is performed using the device disclosed in Japanese Unexamined Patent Publication No. H10-336106 and Japanese Unexamined Patent Publication No. 2000-295185, the optical fibers of the optical cable are necessarily inspected one by one, and thus it takes a lot of time for the inspection.

In the present disclosure, a measurement system and a measurement method to improve an inspection efficiency of an optical transmission line will be explained.

A measurement system according to an aspect of the present disclosure is a system inspecting an optical transmission line configured by connecting a plurality of optical cables, each of which includes a plurality of optical fibers. The optical transmission line includes a plurality of optical fiber lines configured by connecting the plurality of optical fibers in the plurality of optical cables. The measurement system includes a first measurement device disposed at a first end of the optical transmission line, and a second measurement device disposed at a second end of the optical transmission line. The first measurement device and the second measurement device perform a first measurement to inspect whether the optical cable is misconnected, and a second measurement to inspect the plurality of optical fiber lines in a case where it is determined that there is no misconnection in the first measurement.

DETAILED DESCRIPTION

Description of Embodiment of the Invention

Figure 1:
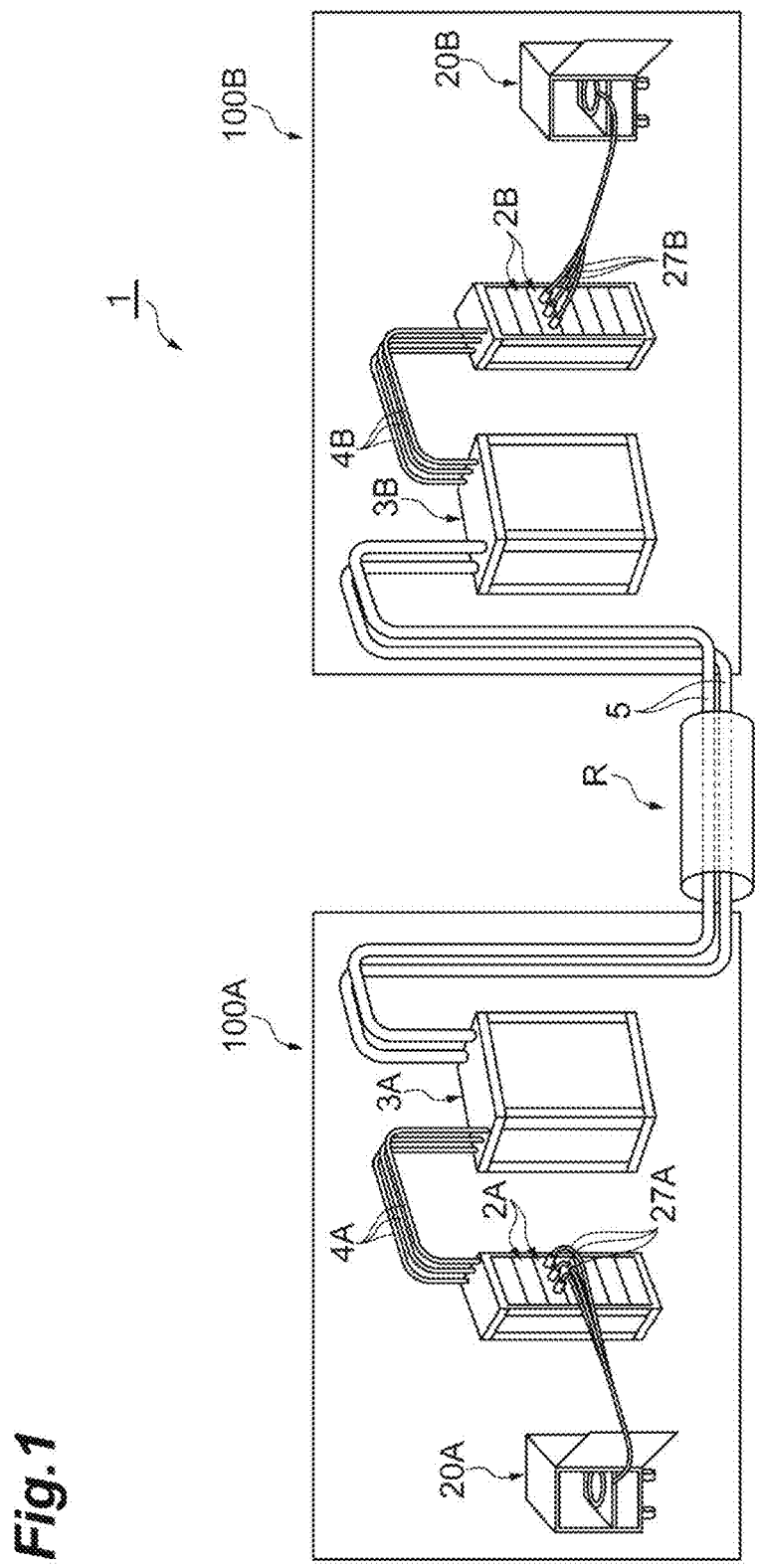
FIG. 1 is a diagram schematically illustrating a configuration of an optical transmission system which is a measurement target of a measurement system according to the embodiment.

First, the contents of embodiments of the present disclosure will be listed and described.

A measurement system according to an aspect of the present disclosure is a system inspecting an optical transmission line configured by connecting a plurality of optical cables, each of which includes a plurality of optical fibers. The optical transmission line includes a plurality of optical fiber lines configured by connecting the plurality of optical fibers in the plurality of optical cables. The measurement system includes a first measurement device disposed at a first end of the optical transmission line, and a second measurement device disposed at a second end of the optical transmission line. The first measurement device and the second measurement device perform a first measurement to inspect whether the optical cable is misconnected, and a second measurement to inspect the plurality of optical fiber lines in a case where it is determined that there is no misconnection in the first measurement.

In the measurement system, the misconnection of the optical cable is inspected. In a case where it is determined that there is no misconnection, the plurality of optical fiber lines are inspected. In a case where there is misconnection of the optical cable, the connection of the optical cable is necessarily recovered without waiting until the plurality of optical fiber lines are inspected. Therefore, an unnecessary inspection can be omitted by inspecting the plurality of optical fiber lines in a case where it is determined that there is no misconnection. As a result, it is possible to improve an inspection efficiency of the optical transmission line.

The first measurement device may include a first light source configured to output testing light, and a first optical switch configured to switch an optical fiber through which the testing light is incident among a plurality of optical fibers of a first optical cable located at the first end of the optical transmission line. The second measurement device may include a power meter configured to measure an intensity of light, and a second optical switch configured to switch an optical fiber optically connected to the power meter among a plurality of optical fibers of a second optical cable located at the second end of the optical transmission line. In the first measurement, the first measurement device may emit the testing light to a first optical fiber among the plurality of optical fibers of the first optical cable, and the second measurement device may measure an intensity of the testing light which is output from a second optical fiber corresponding to the first optical fiber among the plurality of optical fibers of the second optical cable. The misconnection of the optical cable can be determined by inspecting one optical fiber line. In this case, the misconnection of the optical cable is inspected by determining whether the first optical fiber and the second optical fiber are optically and normally connected. Therefore, the first measurement can be easily performed, so that the inspection efficiency of the optical transmission line can be improved.

The first optical cable and the second optical cable each may be a ribbon fiber in which the plurality of optical fibers are arranged in one direction. The first optical fiber may be located at an end in the one direction of the first optical cable, and the second optical fiber may be located at an end in the one direction of the second optical cable. When the ribbon fibers are connected to each other, the front and back sides of the ribbon fibers are easily mistaken and misconnected. In this case, the misconnection can be determined by inspecting a combination of optical fibers in a case where the first optical cable and the second optical cable are normally connected, and a combination of the optical fibers in a case where the first optical cable and the second optical cable are connected in reverse of the front and back sides. At this time, the optical fiber located at the end of the ribbon fiber is located at the end in a case where the ribbon fibers are normally connected to each other and in a case where the ribbon fibers are connected in reverse of the front and back sides. Therefore, the misconnection can be simply identified by using optical fibers located at the end in the one direction of the first optical cable and the second optical cable.

The first light source may be capable of outputting a plurality of testing lights having different wavelengths. The first measurement device and the second measurement device may inspect whether the optical cable is misconnected using the plurality of testing lights in the first measurement. The inspection accuracy may be different depending on the wavelength of the testing light. For example, in a case where the optical fiber is bent, a bend loss is increased as the testing light has a large wavelength, so that a detection accuracy of the bending becomes higher. Therefore, it is possible to improve the inspection accuracy by inspecting a plurality of testing lights having different wavelengths.

In the second measurement, the first measurement device may sequentially emit the testing light to the plurality of optical fibers of the first optical cable, and the second measurement device may sequentially measure an intensity of the testing light which is output from an optical fiber corresponding to the optical fiber through which the testing light of the first optical cable is incident among the plurality of optical fibers of the second optical cable. In this case, it is possible to check each of the plurality of optical fiber lines whether the optical fiber is normally connected.

The first measurement device may further include a first tester to measure a temporal change of an intensity of first return light with respect to the testing light which is output from the first light source. The second measurement device may further include a second light source to output the testing light, and a second tester to measure a temporal change of an intensity of second return light with respect to the testing light which is output from the second light source. The length of each optical fiber line can be measured by the temporal change of the intensity of the return light. For example, in a case where the measured length is shorter than the length of the normal optical fiber line, it is considered that breakage occurs in the optical fiber line. Therefore, it is possible to inspect whether each optical fiber line is abnormal.

Whenever the optical transmission line is inspected, the first tester may measure the temporal change of the intensity of the first return light before the first measurement to calculate an insertion loss of the first optical switch, and the second tester may measure the temporal change of the intensity of the second return light to calculate an insertion loss of the second optical switch. The insertion loss of the first optical switch and the insertion loss of the second optical switch may be low in reproducibility due to change over time. Therefore, whenever the inspection is performed, the temporal change of the intensity of the first return light is measured, and the insertion loss of the first optical switch is calculated on the basis of the measurement result, so that an error of the insertion loss of the first optical switch can be reduced. Similarly, whenever the inspection is performed, the temporal change of the intensity of the second return light is measured, and the insertion loss of the second optical switch is calculated on the basis of the measurement result, so that the error of the insertion loss of the second optical switch can be reduced. With this configuration, the measurement accuracy of an optical loss of the optical fiber line can be improved.

The measurement system may further include an analysis unit configured to analyze an abnormal cause of the optical transmission line on the basis of a measurement result of the power meter in a case where it is determined that there is misconnection in the first measurement. For example, in a case where the light is not received by the power meter, there is a possibility that the optical cable is not correctly connected. In addition, in a case where the light is received by the power meter but a loss is large, it is considered that the optical cable is correctly connected but an abnormality such as a bending occurs in the optical cable. In this way, a repairing work of the optical transmission line can be simplified by analyzing the abnormal cause according to the measurement result of the power meter.

The first measurement device may further include a first optical multiplexer/demultiplexer which is provided between the first optical switch and the first light source, and a first communication device which is connected to the first optical switch through the first optical multiplexer/demultiplexer, and communicates with the second measurement device. The second measurement device may further include a second optical multiplexer/demultiplexer which is provided between the second optical switch and the power meter, and a second communication device which is connected to the second optical switch through the second optical multiplexer/demultiplexer, and communicates with the first measurement device. In this case, since there is no need to provide a dedicated optical fiber line for the communication in the optical transmission line, the optical transmission line can be effectively used.

The first measurement device may further include another power meter to measure an intensity of first return light with respect to the testing light which is output from the first light source. In this case, a return loss of each optical fiber line can be measured.

The first measurement device may further include a visible light source configured to output a visible light. The first measurement device may emit the visible light to an optical fiber line which is determined as abnormal in the second measurement among the plurality of optical fiber lines. For example, in a case where an abnormality such as breakage, bending, or fusion in axial deviation occurs in the optical fiber line, the visible light may leak out of the abnormal place to flash the abnormal place. In this case, since the visibility of the abnormal place can be increased, it is possible to specify the abnormal place.

The measurement system may further include a display unit configured to display an inspection result of the first measurement and the second measurement. In this case, since the inspection result can be notified to an operator, the visibility of the inspection result can be improved.

The display unit may include a plurality of first connectors which are connected to the plurality of optical fibers of the first optical cable respectively, and a plurality of second connectors which are connected to the plurality of optical fibers of the second optical cable respectively. The plurality of first connectors and the plurality of second connectors each may emit light to display the inspection result. In this case, since the first connector and the second connector each emit light to display the inspection result, the operator can easily specify the abnormal optical fiber line. With this configuration, it is possible to improve the efficiency of the repairing work.

A measurement method according to another aspect of the present disclosure is a method of inspecting an optical transmission line configured by connecting a plurality of optical cables, each of which includes a plurality of optical fibers. The optical transmission line includes a plurality of optical fiber lines configured by connecting the plurality of optical fibers in the plurality of optical cables. The measurement method includes performing a first measurement to inspect the presence or absence of misconnection of the plurality of optical cables, and performing a second measurement to inspect the plurality of optical fiber lines in a case where it is determined that there is no misconnection in the first measurement.

In the measurement method, the misconnection of the optical cable is inspected. In a case where it is determined that there is no misconnection, the plurality of optical fiber lines are inspected. In a case where there is misconnection of the optical cable, the connection of the optical cable is necessarily recovered without waiting until the plurality of optical fiber lines are inspected. Therefore, an unnecessary inspection can be omitted by inspecting the plurality of optical fiber lines in a case where it is determined that there is no misconnection. As a result, it is possible to improve an inspection efficiency of the optical transmission line.

Detailed Description of Embodiment of the Invention

A specific example of the measurement system and the measurement method according to the embodiment of the present disclosure will be described hereinafter with reference to the drawings. Further, the invention is not limited to the embodiments, but includes meanings which are indicated by the claims and equivalent to the claims, and all the changes within the claims.

FIG. 1 is a diagram schematically illustrating a configuration of an optical transmission system which is a measurement target of the measurement system according to the embodiment. An optical transmission system 1 illustrated in FIG. 1 is a system which transmits an optical signal between points different from each other. In the embodiment, the optical transmission system 1 transmits the optical signal between a location 100A and a location 100B. The location 100A and the location 100B are connected by a plurality of optical cables 5.

The location 100A includes a plurality of patch panels 2A and a splice cabinet 3A. The patch panel 2A is to connect a device such as a server in the location 100A to an external device for communication, and is stored in each section of an optical cable rack (rack) which is provided in the location 100A. Further, a dimension of the optical cable rack is standardized. The width and depth of the optical cable rack are constant, and the height is an integer multiple of "1U" when 44 mm is set as "1U". The patch panel 2A includes a plurality of adaptors. An optical connector which is provided at one end of an optical cable is inserted in each adaptor. The adaptors of the patch panel 2A include external adaptors which are connected to a plurality (for example, 24) of optical cables 4A (first optical cable) and internal adaptors which are connected to a plurality of optical cables connected to devices in the location 100A.

Each of the plurality of optical cables 4A includes a plurality (N) of optical fibers. "N" is an integer of 2 or more (for example, "12"). In the embodiment, the optical cable 4A is a ribbon fiber (also referred to as ribbon optical fiber) in which N optical fibers are arranged in one direction. In the following description, the N optical fibers of the optical cable 4A may be called a 1st optical fiber, a 2nd optical fiber, . . . , and an N-th optical fiber in an order from one end in one direction. The other end of the optical cable 4A is connected to one end of the optical cable 5 in the splice cabinet 3A.

The optical cable 5 includes N optical fibers. In the embodiment, the optical cable 5 is a ribbon fiber in which N optical fibers are arranged in one direction. In the following description, the N optical fibers of the optical cable 5 may be called a 1st optical fiber, a 2nd optical fiber, . . . , and an N-th optical fiber in an order from one end in one direction. Each of the N optical fibers of the optical cable 4A is connected (fusion-spliced) to any one of the N optical fibers of the optical cable 5 in a one-to-one manner.

The location 100B includes a plurality of patch panels 2B and a splice cabinet 3B. The patch panel 2B is to connect a device such as a server in the location 100B to an external device for communication, and is stored in each section of an optical cable rack (rack) which is provided in the location 100B. The patch panel 2B includes a plurality of adaptors. An optical connector which is provided at one end of an optical cable is inserted in each adaptor. The adaptors of the patch panel 2B include external adaptors which are connected to a plurality (for example, 24) of optical cables 4B (second optical cable) and internal adaptors which are connected to a plurality of optical cables connected to devices in the location 100B.

Each of the plurality of optical cables 4B includes N optical fibers. In the embodiment, the optical cable 4B is a ribbon fiber in which N optical fibers are arranged in one direction. In the following description, the N optical fibers of the optical cable 4B may be called a 1st optical fiber, a 2nd optical fiber, . . . , and an N-th optical fiber in an order from one end in one direction. The other end of the optical cable 4B is connected to the other end of the optical cable 5 in the splice cabinet 3B. Each of the N optical fibers of the optical cable 4B is fusion-spliced to any one of the N optical fibers of the optical cable 5 in a one-to-one manner. Further, the splice cabinets 3A and 3B are used in the above example, but it is not necessary to have a cabinet shape.

In this way, the optical cable 4A connected to the patch panel 2A, the optical cable 5, and the optical cable 4B connected to the patch panel 2B are connected in this order so as to form an optical transmission line R. The optical cable 4A is located at one end of the optical transmission line R, and the optical cable 4B is located at the other end of the optical transmission line R. The optical transmission line R includes a plurality of optical fiber lines fr. The optical fiber line fr is configured by the optical fibers of the optical cable 4A, the optical fibers of the optical cable 5, and the optical fibers of the optical cable 4B which are connected in this order. In the following description, an optical fiber line configured by optically connecting a k-th optical fiber of the optical cable 4A and a k-th optical fiber of the optical cable 4B through the optical cable 5 may be called "k-th optical fiber line" (k is an integer of 1 or more and N or less).

Figure 2:
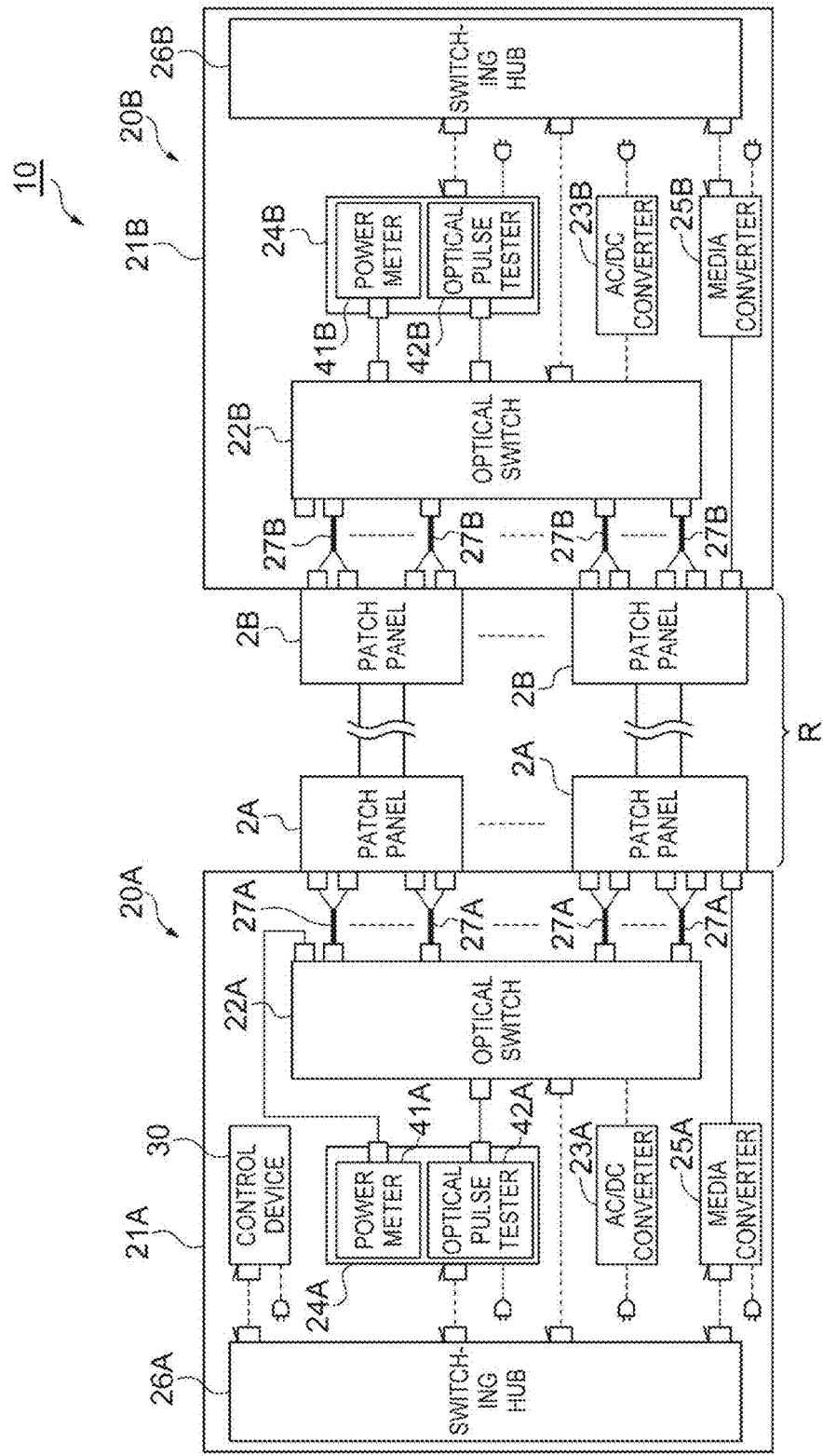
FIG. 2 is a diagram schematically illustrating a configuration of the measurement system.

Next, the description will be given about a measurement system 10 which inspects the optical transmission line R of the optical transmission system 1 with reference to FIG. 2. FIG. 2 is a diagram schematically illustrating a configuration of the measurement system. The measurement system 10 illustrated in FIG. 2 is a system which inspects the optical transmission line R between the location 100A and the location 100B. More specifically, the measurement system 10 inspects the optical transmission line R between the patch panel 2A and the patch panel 2B. The measurement system 10 includes a measurement device 20A (first measurement device), a measurement device 20B (second measurement device), and a control device 30. The measurement devices 20A and 20B performs a pre-measurement (first measurement) in which the misconnection of the optical cable (the optical cables 4A, 5, and 4B) constituting the optical transmission line R is inspected, and a main measurement (second measurement) in which the plurality of optical fiber lines fr included in the optical transmission line R are inspected in a case where it is determined that there is no misconnection in the pre-measurement.

The measurement device 20A is disposed in the location 100A. In other words, the measurement device 20A is disposed on one end of the optical transmission line R. The measurement device 20A includes a rack 21A, an optical switch 22A (first optical switch), an AC/DC converter 23A, a measuring device 24A, a media converter 25A (first communication device), and a switching hub 26A.

The rack 21A stores the optical switch 22A, the AC/DC converter 23A, the measuring device 24A, the media converter 25A, the switching hub 26A, and the control device 30. As an example of the rack 21A, there is used a rack with casters in order to easily move the measurement device 20A.

The optical switch 22A is a device to switch the transmission path of light. For example, the optical switch 22A includes 1,728 ports. In the optical switch 22A, a power meter 41A, an optical pulse tester (OTDR) 42A, and the internal adaptors of the plurality of patch panels 2A are connected to the ports through the optical cable. The ports of the optical switch 22A and the internal adaptors of the plurality of patch panels 2A are connected by an optical cable 27A. As an example of the optical cable 27A, there is used an MPO-LC fan-out optical cable. The MPO-LC fan-out optical cable includes a multiple core connector (for example, an MPO connector) which is integrally provided with respect to a plurality of optical fibers at one end, includes a simplex connector (for example, LC connector) which is provided for each optical fiber at the other end, and are separated into single core optical fibers in the middle of going from the one end to the other end. The multiple core connector and the simplex connector are not limited to the above examples. In addition, the ports of the optical switch 22A and the internal adaptors of the plurality of patch panels 2A may be individually connected by the single core fibers.

For example, the optical switch 22A switches the transmission path such that any one adaptor of the patch panel 2A or the power meter 41A is selectively connected to the optical pulse tester 42A, and selectively supplies testing light output from the optical pulse tester 42A to any one adaptor of the patch panel 2A or the power meter 41A. In other words, the optical switch 22A switches the optical fiber through which the testing light is incident among the N optical fibers of the optical cable 4A, or emits the testing light to be incident on the power meter 41A. The optical switch 22A switches the transmission path on the basis of a switching instruction which is output from the control device 30. The optical switch 22A is driven by a DC voltage which is supplied from the AC/DC converter 23A.

The AC/DC converter 23A converts an AC voltage supplied from a commercial power source into a DC voltage, and supplies the converted DC voltage to the optical switch 22A. Further, in a case where the optical switch 22A is directly driven by the commercial power source, the AC/DC converter 23A may be not provided. In addition, in a case where an AC voltage obtained by converting the AC voltage supplied from the commercial power source, the voltage converter may be provided.

The measuring device 24A includes the power meter 41A and the optical pulse tester 42A. The power meter 41A is a device to measure an optical power (intensity), and measures the intensity of the testing light which is input through the optical switch 22A. The power meter 41A measures the intensity of the testing light on the basis of a measuring instruction which is output from the control device 30.

The optical pulse tester 42A includes a light source (first light source) which outputs the testing light, receives the return light with respect to the testing light which is output from the light source to measure the temporal change of the intensity of the return light. The return light contains backscattering light and Fresnel reflected light of the testing light. In the following description, the measurement of the temporal change of the intensity of the return light may be called "OTDR measurement". For example, a wavelength of the testing light output by the light source is 1,310 nm or 1,550 nm. The light source may output a plurality of testing lights having different wavelengths. For example, the light source outputs testing light having a wavelength of 1,310 nm, and testing light having a wavelength of 1,550 nm. The optical pulse tester 42A (light source) outputs the testing light on the basis of a light output instruction which is output from the control device 30. The optical pulse tester 42A performs the OTDR measurement on the basis of the measuring instruction which is output from the control device 30.

The media converter 25A is a communication device to communicate with the measurement device 20B. The media converter 25A converts an electrical signal and an optical signal to each other. The media converter 25A converts the electrical signal received from the switching hub 26A into the optical signal. The media converter 25A is connected to the patch panel 2A, and transmits the optical signal to a media converter 25B (second communication device) through the patch panel 2A, the optical cable 4A, the optical cable 5, the optical cable 4B, and the patch panel 2B. The media converter 25A converts the optical signal received from the media converter 25B through the patch panel 2B, the optical cable 4B, the optical cable 5, the optical cable 4A, and the patch panel 2A into the electrical signal, and outputs the electrical signal to the switching hub 26A.

The switching hub 26A is a device to connect the optical switch 22A, the measuring device 24A, the media converter 25A, and the control device 30 using the electrical signal for communication. For example, the optical switch 22A, the measuring device 24A, the media converter 25A, and the control device 30 are connected to the switching hub 26A by a LAN (Local Area Network) cable.

The measurement device 20B is disposed in the location 100B. In other words, the measurement device 20B is disposed on the other end of the optical transmission line R. The measurement device 20B has the same configuration as the measurement device 20A. In other words, the measurement device 20B includes a rack 21B, an optical switch 22B (second optical switch), an AC/DC converter 23B, a measuring device 24B, the media converter 25B, and a switching hub 26B.

The rack 21B stores the optical switch 22B, the AC/DC converter 23B, the measuring device 24B, the media converter 25B, and the switching hub 26B. As an example of the rack 21B, there is used a rack with casters in order to easily move the measurement device 20B.

The optical switch 22B is a device to switch the transmission path of light. For example, the optical switch 22B includes 1,728 ports. In the optical switch 22B, a power meter 41B, an optical pulse tester 42B, and the internal adaptors of the plurality of patch panels 2B are connected to the ports through the optical cable. The ports of the optical switch 22B and the internal adaptors of the plurality of patch panels 2B are connected by an optical cable 27B. As an example of the optical cable 27B, there is used an MPO-LC fan-out optical cable. The connection configuration between the multiple core connector and the simplex connector is not limited, and the ports of the optical switch 22B and the internal adaptors of the plurality of patch panels 2B may be individually connected by the single core fibers.

For example, the optical switch 22B switches the transmission path to selectively connect any one adaptor of the patch panel 2B to the power meter 41B. In other words, the optical switch 22B switches the optical fiber optically connected to the power meter 41B among the N optical fibers of the optical cable 4B. For example, the optical switch 22B switches the transmission path to selectively connect any one adaptor of the patch panel 2B to the optical pulse tester 42B, and selectively supplies the testing light output from the optical pulse tester 42B to any one adaptor of the patch panel 2B. In other words, the optical switch 22B switches the optical fiber through which the testing light is incident among the N optical fibers of the optical cable 4B. The optical switch 22B switches the transmission path on the basis of the switching instruction which is output from the control device 30. The optical switch 22B is driven by a DC voltage which is supplied from the AC/DC converter 23B.

The AC/DC converter 23B converts an AC voltage supplied from a commercial power source into a DC voltage, and supplies the converted DC voltage to the optical switch 22B. Further, in a case where the optical switch 22B is directly driven by the commercial power source, the AC/DC converter 23B may be not provided. In addition, in a case where an AC voltage obtained by converting the AC voltage supplied from the commercial power source, the voltage converter may be provided.

The measuring device 24B includes the power meter 41B and the optical pulse tester 42B. The power meter 41B is a device to measure an optical power (intensity), and measures the intensity of the testing light which is input through the optical switch 22B. The power meter 41B measures the intensity of the testing light on the basis of a measuring instruction which is output from the control device 30.

The optical pulse tester 42B includes a light source which outputs the testing light, receives the return light with respect to the testing light which is output from the light source to measure the temporal change of the intensity of the return light (OTDR measurement). The return light contains backscattering light and Fresnel reflected light of the testing light. For example, a wavelength of the testing light output by the light source is 1,310 nm or 1,550 nm. The light source may output a plurality of testing lights having different wavelengths. For example, the light source outputs testing light having a wavelength of 1,310 nm, and testing light having a wavelength of 1,550 nm. The optical pulse tester 42B (light source) outputs the testing light on the basis of a light output instruction which is output from the control device 30. The optical pulse tester 42B performs the OTDR measurement on the basis of the measuring instruction which is output from the control device 30.

The media converter 25B is a communication device to communicate with the measurement device 20A. The media converter 25B converts an electrical signal and an optical signal to each other.

The media converter 25B converts the electrical signal received from the switching hub 26B into the optical signal. The media converter 25B is connected to the patch panel 2B, and transmits the optical signal to the media converter 25A through the patch panel 2B, the optical cable 4B, the optical cable 5, the optical cable 4A, and the patch panel 2A. The media converter 25B converts the optical signal received from the media converter 25A through the patch panel 2A, the optical cable 4A, the optical cable 5, the optical cable 4B, and the patch panel 2B into the electrical signal, and outputs the electrical signal to the switching hub 26B.

The switching hub 26B is a device to connect the optical switch 22B, the measuring device 24B, and the media converter 25B using the electrical signal for communication. For example, the optical switch 22B, the measuring device 24B, and the media converter 25B are connected to the switching hub 26B by a LAN cable.

The control device 30 is a controller which integrally controls the measurement system 10. For example, the control device 30 is configured as a computer system which includes a processor such as a CPU (Central Processing Unit), a memory such as a RAM (Random Access Memory) and a ROM (Read Only Memory), an input device such as a mouse and a keyboard, an output device such as a display, and a communication device such as a network card. As an example of the control device 30, there are used a desktop PC (Personal Computer), a note PC, and a tablet terminal. The control device 30 inspects the optical transmission line R by controlling the measurement system 10 on the basis of a computer program (measurement program) which is stored in the memory. The control device 30 serves as an analysis unit which analyzes an abnormal cause of the optical transmission line R and the optical fiber line fr. Further, while the switching hubs 26A and 26B are used in the above example, a normal hub (a hub of layer 1 in an OSI (Open System Interconnect) reference model) may be used instead of the switching hubs 26A and 26B.

Figure 3:
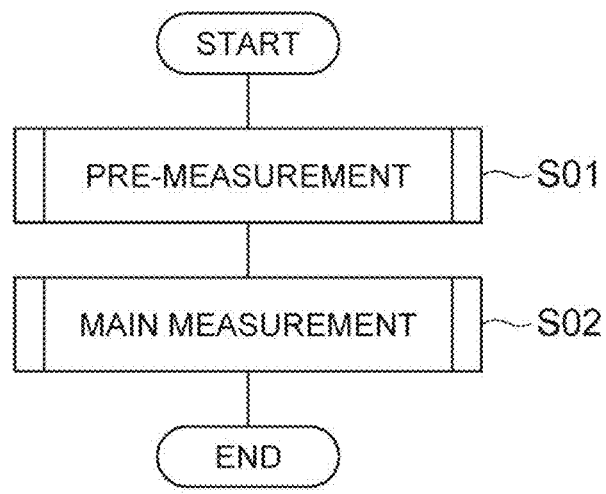
FIG. 3 is a flowchart illustrating an example of a measurement method which is performed by the measurement system.
Figure 4:
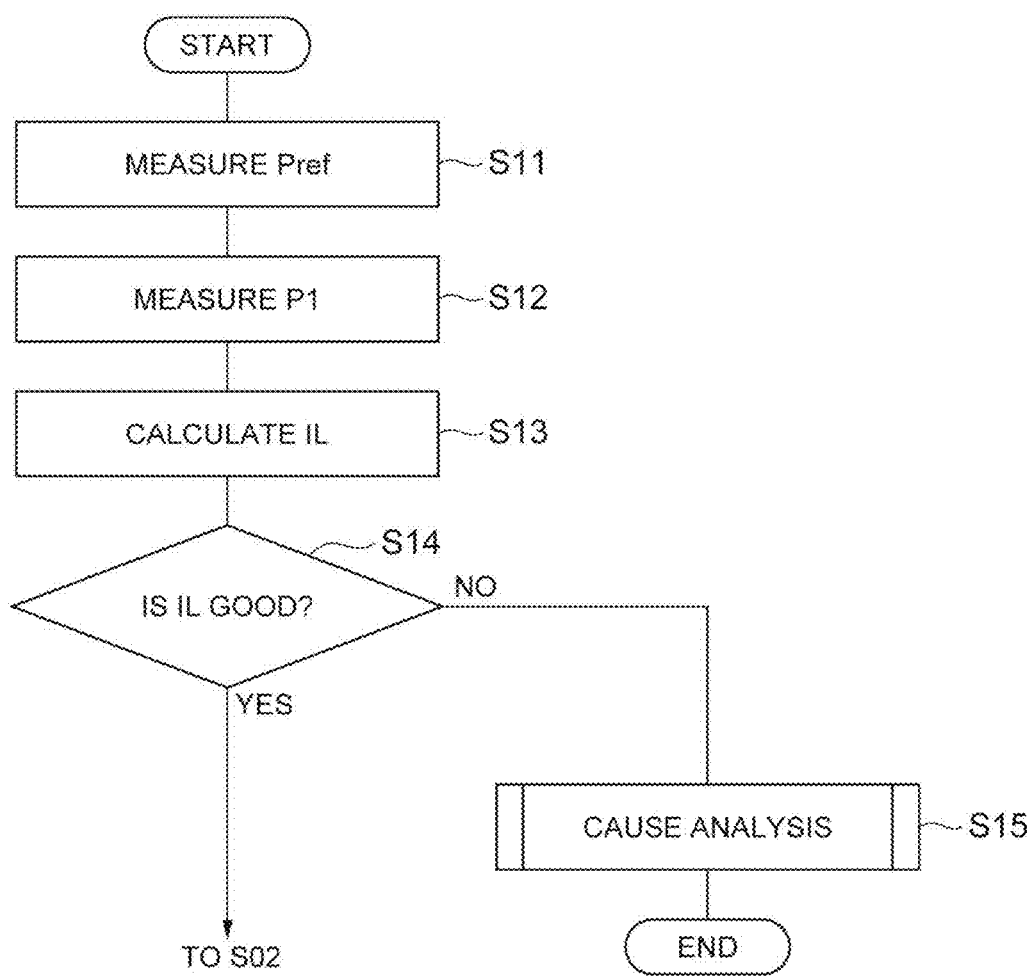
FIG. 4 is a flowchart illustrating a pre-measurement process of FIG. 3 in detail.
Figure 5:
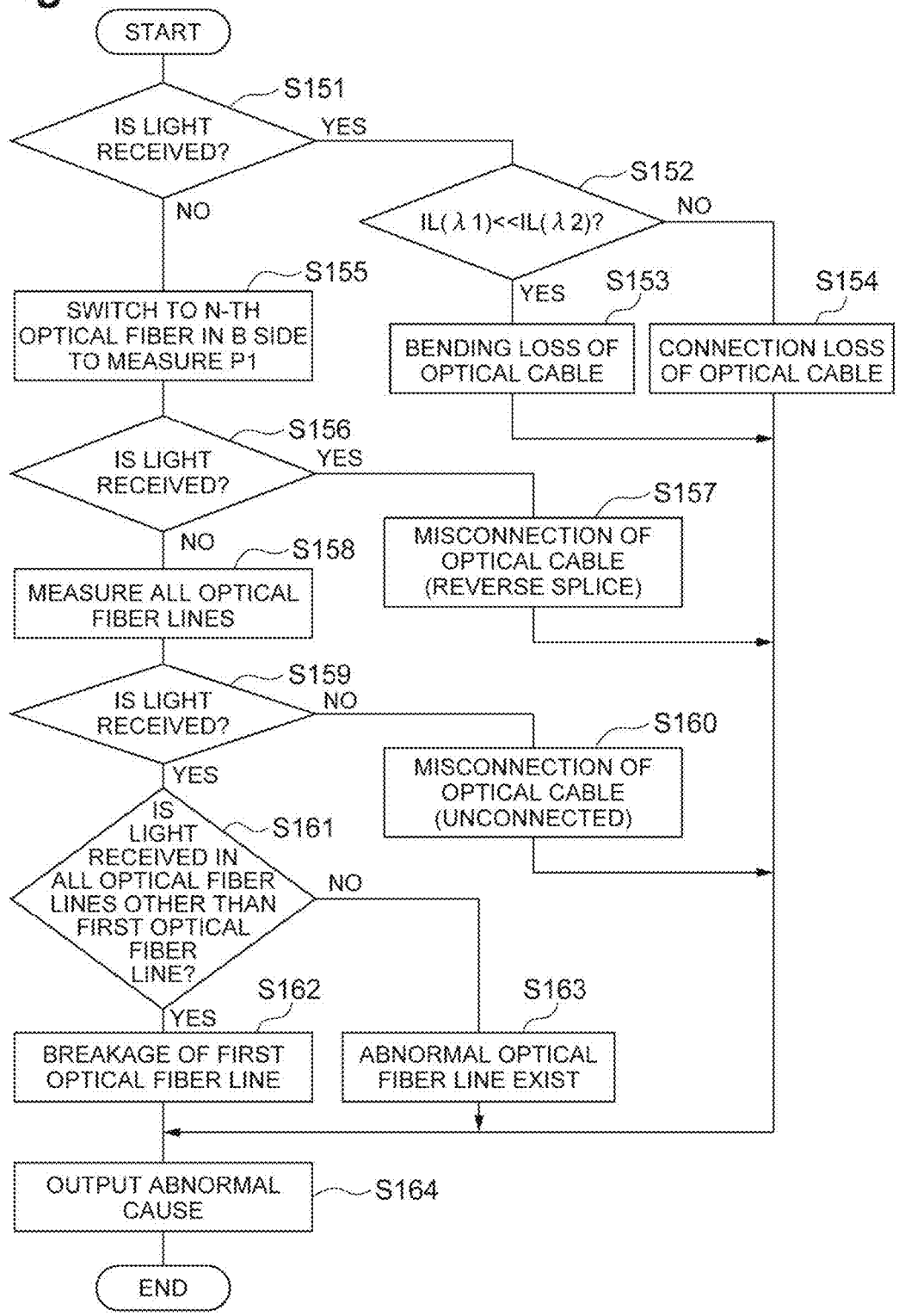
FIG. 5 is a flowchart illustrating a cause analysis process of FIG. 4 in detail.
Figure 6:
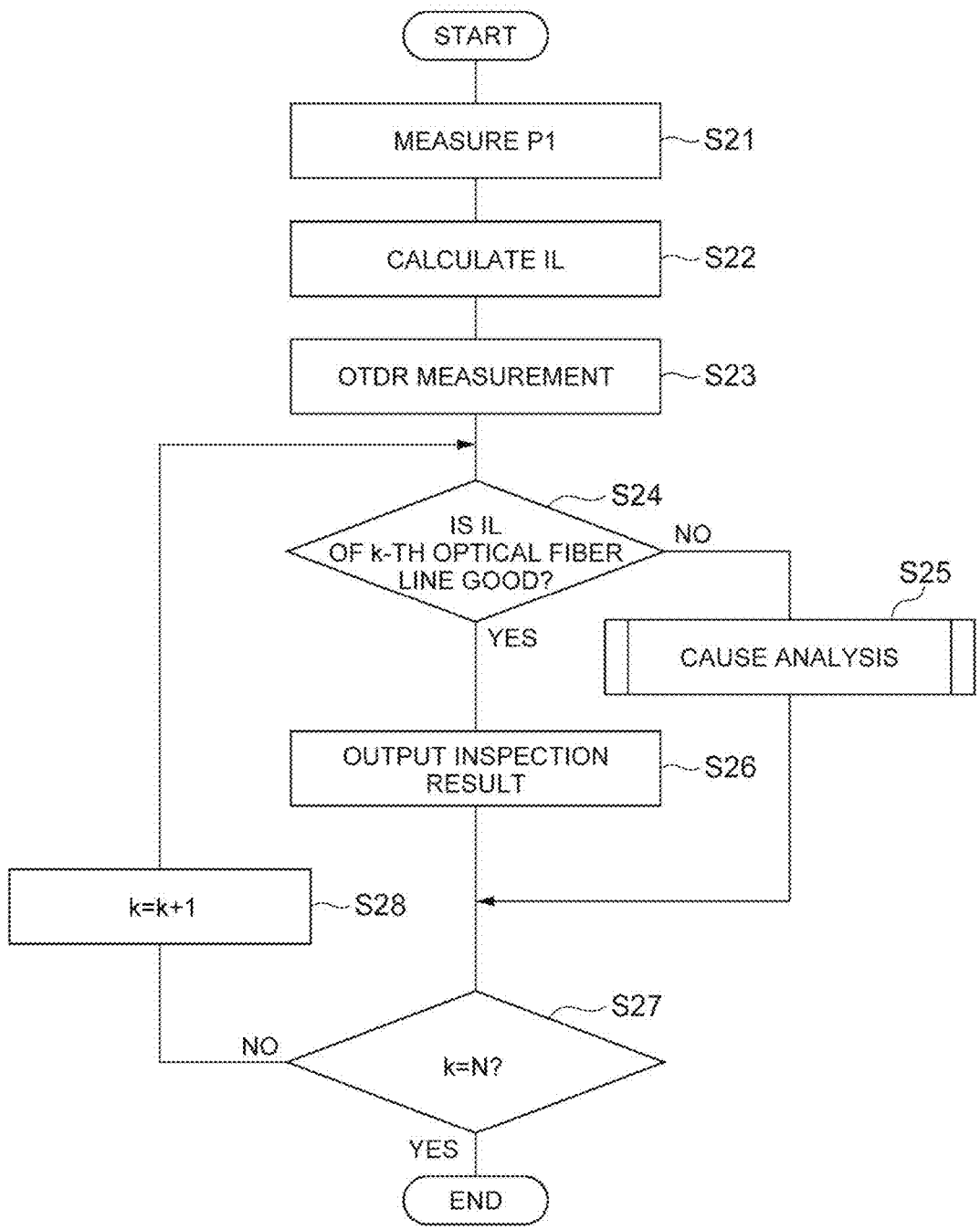
FIG. 6 is a flowchart illustrating a main measurement process of FIG. 3 in detail.
Figure 7:
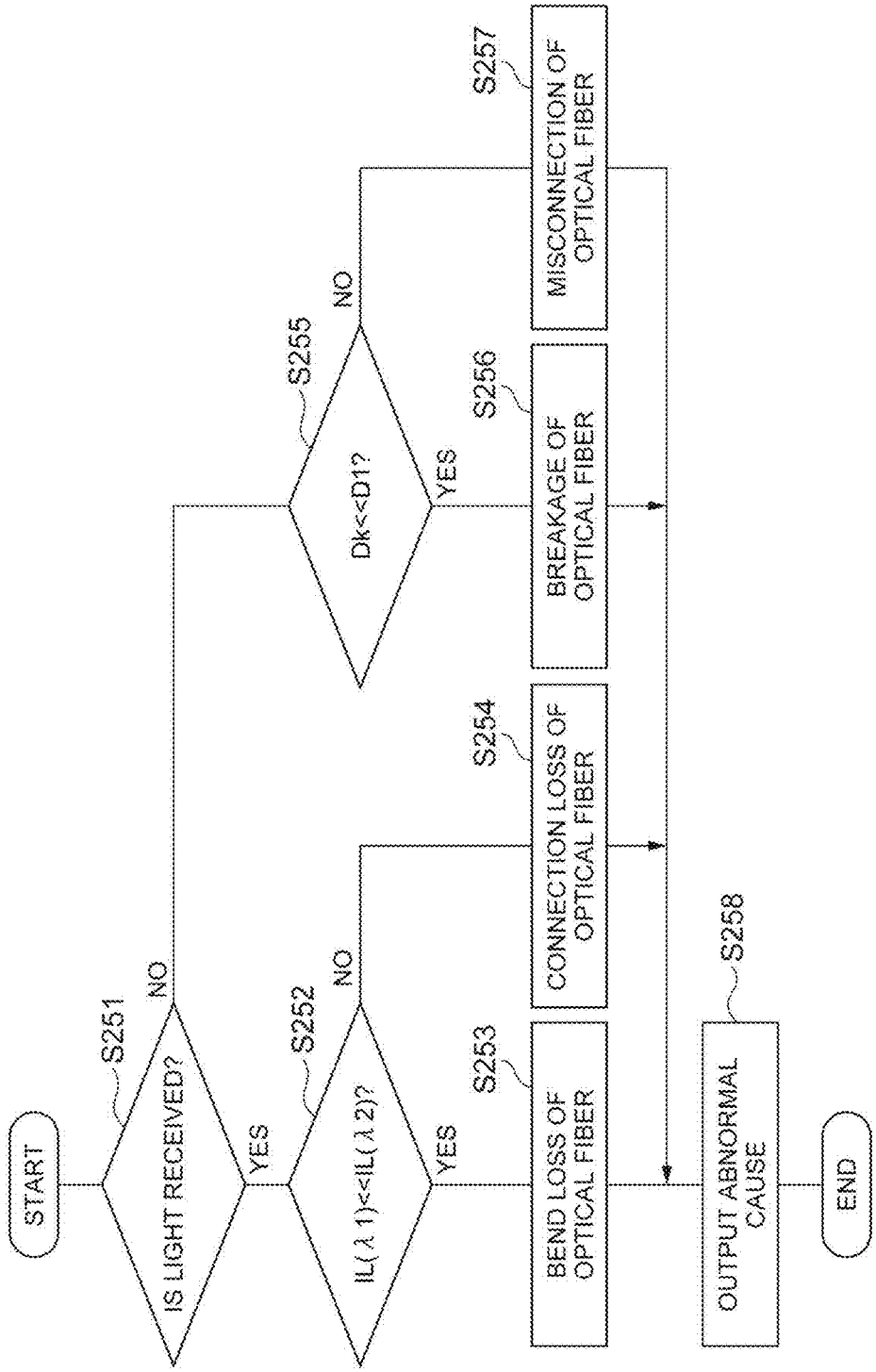
FIG. 7 is a flowchart illustrating a cause analysis process of FIG. 6 in detail.
Figure 8:
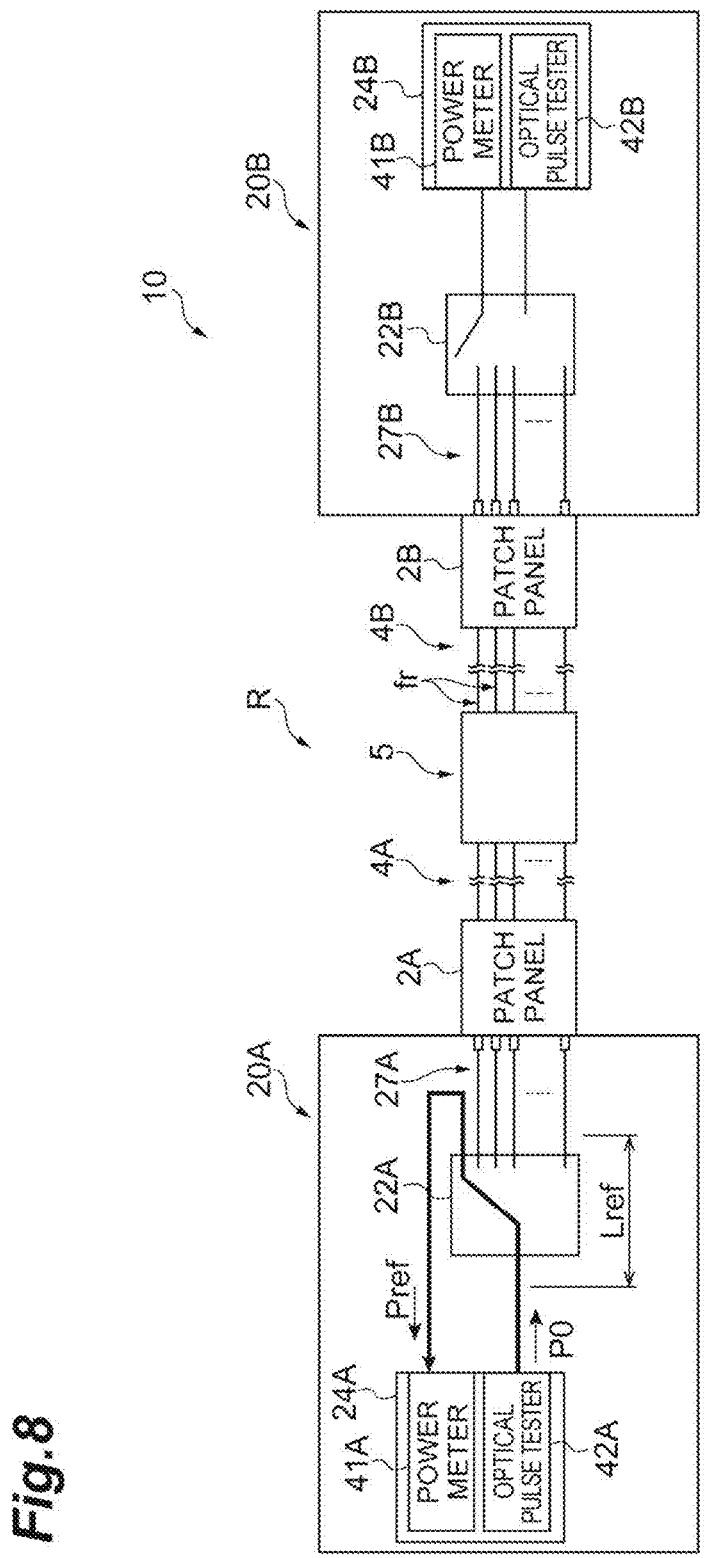
FIG. 8 is a diagram for describing a measuring method of an optical loss.
Figure 9:
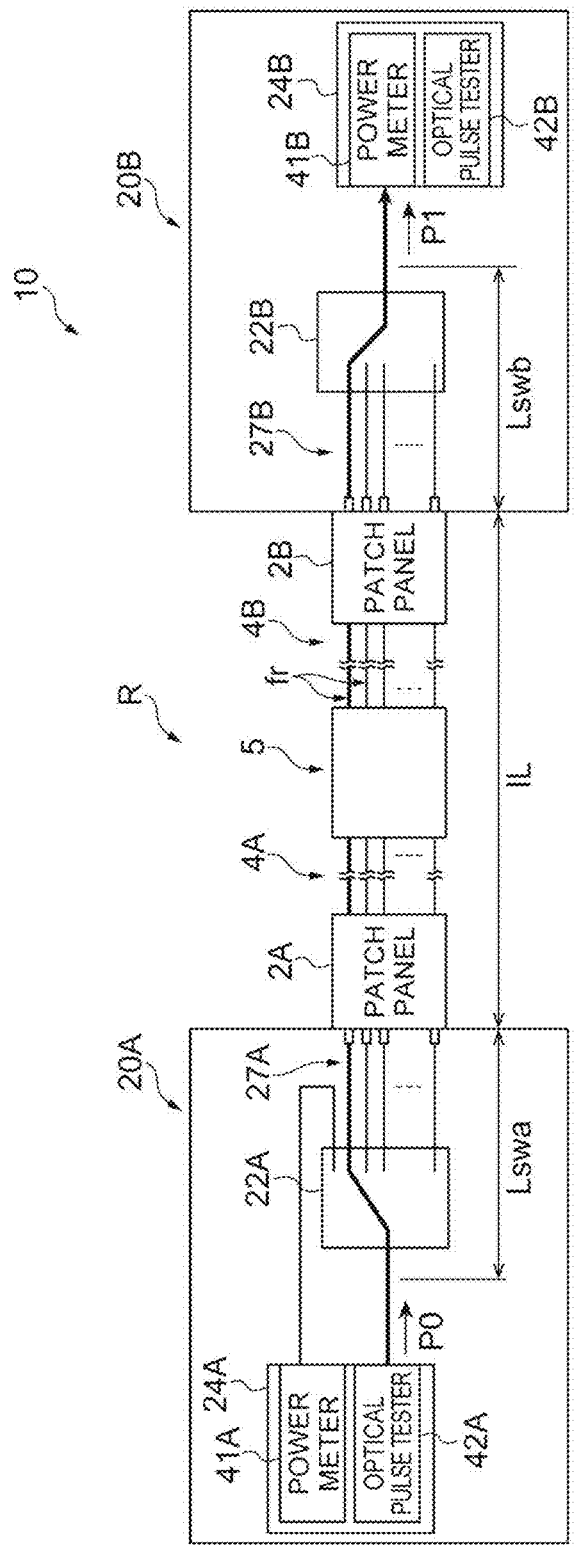
FIG. 9 is a diagram for describing the measuring method of the optical loss.
Figure 10:
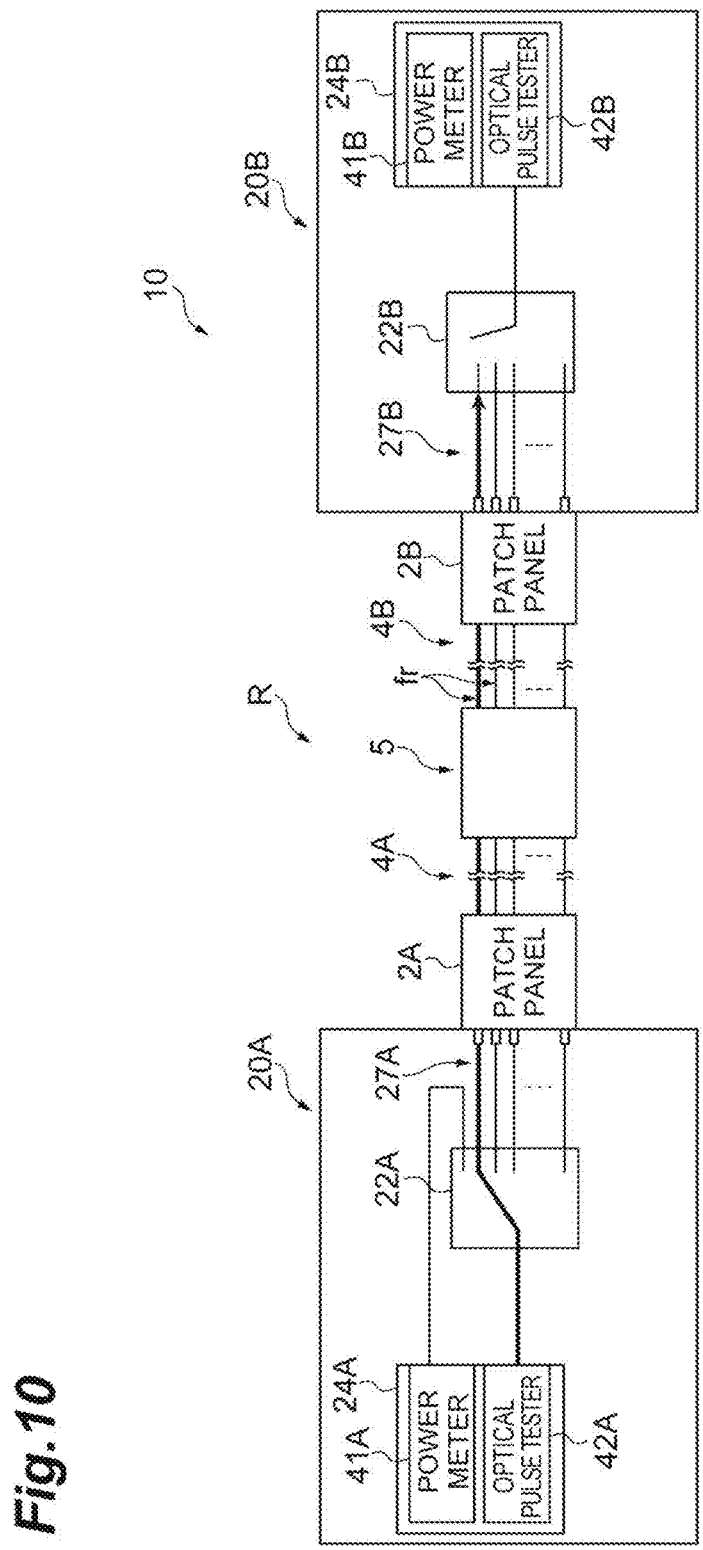
FIG. 10 is a diagram for describing a method of measuring a temporal change of an intensity of return light.
Figure 11:
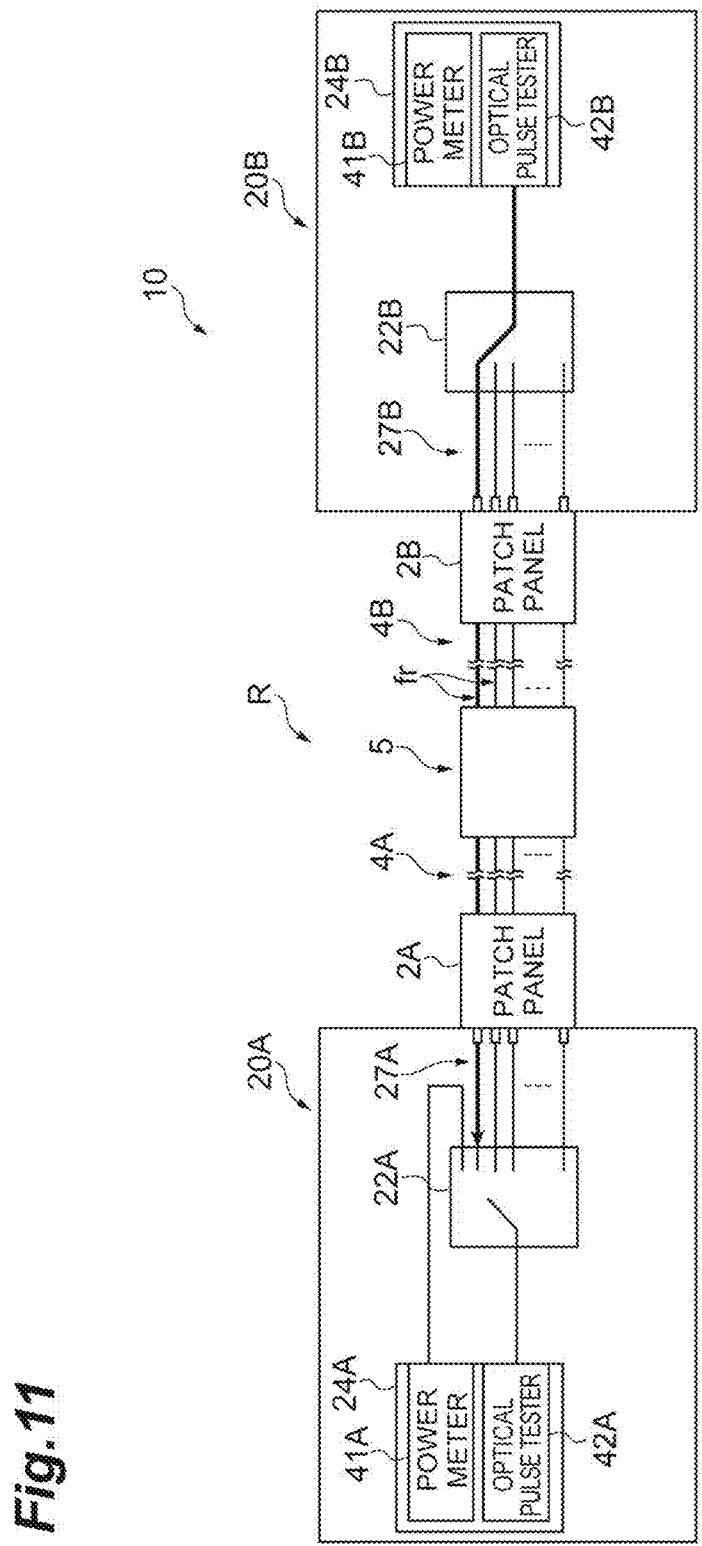
FIG. 11 is a diagram for describing a method of measuring the temporal change of the intensity of the return light.

Next, a measurement method performed by the measurement system 10 will be described with reference to FIGS. 3 to 11. FIG. 3 is a flowchart illustrating an example of the measurement method which is performed by the measurement system. FIG. 4 is a flowchart illustrating a pre-measurement process of FIG. 3 in detail. FIG. 5 is a flowchart illustrating a cause analysis process of FIG. 4 in detail. FIG. 6 is a flowchart illustrating a main measurement process of FIG. 3 in detail. FIG. 7 is a flowchart illustrating a cause analysis process of FIG. 6 in detail. FIGS. 8 and 9 are diagrams for describing a measuring method of the optical loss. FIGS. 10 and 11 are diagrams for describing a method of measuring the temporal change of the intensity of the return light. For example, the measurement method illustrated in FIG. 3 starts when the measurement program is executed in the control device 30.

First, the pre-measurement is performed to inspect whether there is misconnection of the optical cables (the optical cable 4A, the optical cable 5, and the optical cable 4B) (Step S01). In the pre-measurement of Step S01, the measurement device 20A first measures a power Pref as illustrated in FIG. 4 (Step S11). Specifically, as illustrated in FIG. 8, the control device 30 transmits a switching instruction to the optical switch 22A to optically connect a port connected to the optical pulse tester 42A and a port connected to the power meter 41A in the optical switch 22A. Then, the control device 30 causes the optical pulse tester 42A to output the testing light, and causes the power meter 41A to measure the power Pref. Then, the control device 30 receives the power Pref measured by the power meter 41A, and stores the power Pref in a memory (not illustrated).

Subsequently, the measurement device 20A and the measurement device 20B measure a power P1 (Step S12). Specifically, as illustrated in FIG. 9, the control device 30 transmits the switching instruction to the optical switch 22A to optically connect the port connected to the optical pulse tester 42A and a port connected to the 1st optical fiber of the optical cable 4A in the optical switch 22A. The control device 30 transmits the switching instruction to the optical switch 22B to optically connect a port connected to the power meter 41B and a port connected to the 1st optical fiber of the optical cable 4B in the optical switch 22B. Then, the control device 30 causes the optical pulse tester 42A to output the testing light, and causes the power meter 41B to measure the power P1. Then, the control device 30 receives the power P1 which is measured by the power meter 41B.

Further, since the optical cable 4A is not directly connected to the optical switch 22A, the port connected to the 1st optical fiber of the optical cable 4A means a port which is optically connected to the 1st optical fiber of the optical cable 4A through the optical cable 27A and the patch panel 2A. Similarly, since the optical cable 4B is not directly connected to the optical switch 22B, the port connected to the 1st optical fiber of the optical cable 4B means a port which is optically connected to the 1st optical fiber of the optical cable 4B through the optical cable 27B and the patch panel 2B. The similar expression will be used also in the following description.

Subsequently, the control device 30 calculates an optical loss IL of a first optical fiber line fr (Step S13). Specifically, the control device 30 calculates the optical loss IL of the first optical fiber line fr on the basis of the power Pref and the power P1 using Formula (1). An optical loss Lref is a loss in the optical switch 22A. An optical loss Lswa is a loss in the optical switch 22A and the optical cable 27A. An optical loss Lswb is a loss in the optical switch 22B and the optical cable 27B. The optical loss Lref, the optical loss Lswa, and the optical loss Lswb are measured in advance, and stored in a memory of the control device 30.

$$IL = Pref + Lref - P1 - Lswa - Lswb \quad (1)$$

Since a power P0 of the testing light output from the optical pulse tester 42A is not possible to be directly measured, a value obtained by adding the optical loss Lref to the power Pref is calculated as the power P0. Then, a power obtained by subtracting the optical loss Lswa, the optical loss Lswb, and the power P1 from the power P0 is calculated as the optical loss IL. Then, the control device 30 stores an identification number of the optical fiber line fr, the power P1, and the optical loss IL in a memory (not illustrated) in association with each other.

Further, in this example, the optical loss IL is measured using two testing lights having wavelengths (a wavelength $\lambda 1$ and a wavelength $\lambda 2$) different from each other. Therefore, the control device 30 transmits the light output instruction to the optical pulse tester 42A together with information specifying the wavelength in Steps S11 and S12. The wavelength $\lambda 1$ is 1,310 nm, and the wavelength $\lambda 2$ is 1,550 nm. In this case, the control device 30 stores the identification number of the optical fiber line fr, the wavelength of the testing light, the power P1, and the optical loss IL in the memory (not illustrated) in association with each other.

Subsequently, the control device 30 reads the optical loss IL($\lambda 1$) and the optical loss IL($\lambda 2$) from the memory, and determines whether the optical loss IL($\lambda 1$) and the optical loss IL($\lambda 2$) are good (Step S14). The optical loss IL($\lambda 1$) is an optical loss IL in a case where the testing light of the wavelength $\lambda 1$ is used. The optical loss IL($\lambda 2$) is an optical loss IL in a case where the testing light of the wavelength $\lambda 2$ is used. Specifically, the control device 30 compares the optical loss IL($\lambda 1$) and the optical loss IL($\lambda 2$) with a predetermined determination threshold. In a case where the optical loss IL($\lambda 1$) is larger than the determination threshold, the control device 30 determines that the optical loss IL($\lambda 1$) is abnormal (Step S14; NO), and performs the cause analysis process (Step S15). Similarly, in a case where the optical loss IL($\lambda 2$) is larger than the determination threshold, the control device 30 determines that the optical loss IL($\lambda 2$) is abnormal (Step S14; NO), and performs the cause analysis process (Step S15).

In the cause analysis process of Step S15, as illustrated in FIG. 5, first, the control device 30 reads the power P1($\lambda 1$) and the power P1($\lambda 2$) from the memory, and determines whether the testing light of each wavelength is received in the measurement device 20B on the basis of the power P1($\lambda 1$) and the power P1($\lambda 2$) (Step S151). The power P1($\lambda 1$) is a power P1 in a case where the testing light of the wavelength $\lambda 1$ is used. The power P1($\lambda 2$) is a power P1 in a case where the testing light of the wavelength $\lambda 2$ is used. For example, in a case where the power P1($\lambda 1$) and the power P1($\lambda 2$) are "0" or a value small enough to be considered "0", the control device 30 determines that the testing light is not received.

In a case where it is determined that the testing light of at least one wavelength is received (Step S151; YES), the control device 30 compares the optical loss IL($\lambda 1$) with the optical loss IL($\lambda 2$) (Step S152). Herein, since the wavelength $\lambda 2$ is larger than the wavelength $\lambda 1$, the loss of the testing light of the wavelength 22 becomes larger than the testing light of the wavelength $\lambda 1$ even in a case where the optical fiber is bent in the same amount. Therefore, in a case where the optical loss IL($\lambda 2$) is larger than the optical loss IL(λ1), it can be considered that the loss caused by the bending of the optical cable is generated. Therefore, for example, in a case where a result obtained by subtracting the optical loss IL(λ1) from the optical loss IL(λ2) is larger than a threshold for determining the bending (Step S152; YES), the control device 30 determines that the optical cable constituting the optical transmission line R is bent (Step S153).

In the determination of Step S152, in a case where the result obtained by subtracting the optical loss IL(λ1) from the optical loss IL(λ2) is equal to or less that the threshold for determining the bending (Step S152; NO), the control device 30 determines that a loss other than the bending (that is, some loss having a less wavelength dependency) is generated in the optical cable constituting the optical transmission line R (Step S154).

On the other hand, in a case where it is determined that no testing light of any wavelength is received in the determination of Step S151 (Step S151; NO), the control device 30 transmits the switching instruction to the optical switch 22B such that the port connected to the power meter 41B and a port connected to the N-th (12th) optical fiber of the optical cable 4B are optically connected in the optical switch 22B. Then, the control device 30 causes the optical pulse tester 42A to output the testing light, and causes the power meter 41B to measure the power P1 (Step S155). Even in Step S155, the control device 30 causes the power meter 41B to measure the power P1(λ1) and the power P1(λ2) using the testing light of the wavelength λ1 and the testing light of the wavelength λ2.

Then, the control device 30 determines whether the testing light of each wavelength is received in the measurement device 20B on the basis of the measured power P1(λ1) and power P1(λ2), (Step S156). Herein, in a case where the testing light is incident on the 1st optical fiber of the optical cable 4A, and the testing light is received from the N-th optical fiber of the optical cable 4B, it is considered that the optical fibers of the optical cable 4A are arranged in reverse with respect to the optical fibers of the optical cable 4B. In other words, there is a strong possibility that the optical cable 4B is connected in front and back reverse with respect to the optical cable 4A. Therefore, in a case where it is determined that the testing light of at least one of wavelengths is received in the determination of Step S156 (Step S156; YES), the control device 30 determines that the optical cable is misconnected (reverse splice) (Step S157).

On the other hand, in a case where it is determined that no testing light of any wavelength is received in the determination of Step S156 (Step S156; NO), the control device 30 checks the optical fiber lines fr (2nd to N-th optical fiber lines fr) other than the first optical fiber line fr whether the testing light is received (Step S158). Specifically, the control device 30 transmits the switching instruction to the optical switch 22A such that the port connected to the optical pulse tester 42A and a port connected to the 2nd optical fiber of the optical cable 4A are optically connected in the optical switch 22A, and transmits the switching instruction to the optical switch 22B such that the port connected to the power meter 41B and a port connected to the 2nd optical fiber of the optical cable 4B are optically connected in the optical switch 22B. Then, the control device 30 causes the optical pulse tester 42A to output the testing light, and causes the power meter 41B to measure the power P1. The control device 30 repeatedly performs the process on all the 2nd to N-th optical fiber lines fr.

Then, the control device 30 makes a determination on each of the 2nd to N-th optical fiber lines fr whether the testing light is received in the measurement device 20B on the basis of the measured power P1(λ1) and power P1(λ2) (Step S159). Herein, in a case where there is no testing light received in all the optical fiber lines fr, it is considered that the optical cable 4A and the optical cable 4B are not optically connected. For example, the optical cable 4A may be considered to be connected to another optical cable 4B. Therefore, in a case where the testing light is not received even in any optical fiber line fr in the determination of Step S159 (Step S159; NO), the control device 30 determines that the optical cable is misconnected (unconnected) (Step S160).

On the other hand, in a case where it is determined that the testing light is received in any one of the 2nd to N-th optical fiber lines fr in the determination of Step S159 (Step S159; YES), the control device 30 determines whether the testing light is received in all the 2nd to N-th optical fiber lines fr (Step S161). In other words, the control device 30 determines whether the testing light is not received only in the first optical fiber line fr, or the testing light is not received even in another optical fiber line fr.

In a case where it is determined that the testing light is not received only in the first optical fiber line fr (Step S161; YES), the control device 30 determines that the optical cable is correctly connected, but improper connection (for example, breakage) occurs in the first optical fiber line fr (Step S162). On the other hand, in a case where it is determined that the testing light is not received not only in the first optical fiber line fr but also in another optical fiber line fr (Step S161; NO), the control device 30 determines that the optical cable is correctly connected, but there is an abnormal optical fiber line fr (Step S163).

Then, the control device 30 outputs the abnormal cause which is determined in any one of Steps S153, S154, S157, S160, S162, and S163 (Step S164). For example, the control device 30 may store information indicating the abnormal cause in the memory, or may display the abnormal cause in a display device such as a display.

In the determination of Step S14, in a case where the optical loss IL(λ1) is equal to or less than the determination threshold, and the optical loss IL(λ2) is equal to or less than the determination threshold, the control device 30 determines that the optical loss IL(λ1) and the optical loss IL(λ2) are good (that is, the optical cable 4A, the optical cable 5, and the optical cable 4B are not misconnected) (Step S14; YES), and performs the main measurement (Step S02).

In the main measurement of Step S02, as illustrated in FIG. 6, first, the control device 30 causes the measurement device 20A and the measurement device 20B to measure the power P1 of each optical fiber line fr (Step S21). Specifically, the control device 30 transmits the switching instruction to the optical switch 22A such that the port connected to the optical pulse tester 42A and the port connected to the 1st optical fiber of the optical cable 4A are optically connected in the optical switch 22A, and transmits the switching instruction to the optical switch 22B such that the port connected to the power meter 41B and the port connected to the 1st optical fiber of the optical cable 4B are optically connected in the optical switch 22B. Then, the control device 30 causes the optical pulse tester 42A to output the testing light, and causes the power meter 41B to measure the power P1. Then, the control device 30 receives the power P1 which is measured by the power meter 41B.

Subsequently, the control device 30 calculates the optical loss IL of the optical fiber line fr (Step S22). Specifically, the control device 30 calculates the optical loss IL of the optical fiber line fr using Formula (1) on the basis of the power Pref and the power P1. Then, the control device 30 stores an identification number of the optical fiber line fr, the power P1, and the optical loss IL in a memory (not illustrated) in association with each other. The control device 30 repeatedly performs Steps S21 and S22 from the first optical fiber line fr to the N-th optical fiber line fr.

Subsequently, the control device 30 causes the measurement device 20A and the measurement device 20B to measure the temporal change of the intensity of the return light with respect to each optical fiber line fr (Step S23). Specifically, as illustrated in FIG. 10, the control device 30 transmits the switching instruction to the optical switch 22A such that the port connected to the optical pulse tester 42A and the port connected to the 1st optical fiber of the optical cable 4A are optically connected in the optical switch 22A, and transmits the switching instruction to the optical switch 22B such that the port connected to the 1st optical fiber of the optical cable 4B is not optically connected to other ports in the optical switch 22B. Then, the control device 30 causes the optical pulse tester 42A to output the testing light, and causes the optical pulse tester 42A to measure the temporal change of the intensity of the return light. Then, the control device 30 receives a measurement result of the optical pulse tester 42A, and stores the result in the memory (not illustrated) together with the identification number of the optical fiber line fr. The control device 30 repeatedly performs the process from the 1st optical fiber of the optical cable 4A to the N-th optical fiber sequentially.

Subsequently, as illustrated in FIG. 11, the control device 30 transmits the switching instruction to the optical switch 22B such that the port connected to the optical pulse tester 42B and the port connected to the 1st optical fiber of the optical cable 4B are optically connected in the optical switch 22B, and transmits the switching instruction to the optical switch 22A such that the port connected to the 1st optical fiber of the optical cable 4A is not optically connected to other ports in the optical switch 22A. Then, the control device 30 causes the optical pulse tester 42B to output the testing light, and causes the optical pulse tester 42B to measure the temporal change of the intensity of the return light. Then, the control device 30 receives a measurement result of the optical pulse tester 42B, and stores the result to the memory (not illustrated) together with the identification number of the optical fiber line fr. The control device 30 repeatedly performs the process from the 1st optical fiber to the N-th optical fiber of the optical cable 4B sequentially.

Further, in this example, the power P1 and the temporal change of the intensity of the return light are measured by two testing lights having the wavelengths (the wavelength λ1 and the wavelength λ2) different from each other. Therefore, the control device 30 transmits the light output instruction to the optical pulse testers 42A and 42B together with the information specifying the wavelength in Steps S21 and S23. In this case, the control device 30 stores the identification number of the optical fiber line fr, the wavelength of the testing light, and the above-described measurement result in the memory (not illustrated) in association with each other.

Subsequently, the control device 30 reads the optical loss IL(λ1) and the optical loss IL(λ2) of the k-th optical fiber line fr from the memory, and determines whether the optical loss IL(λ1) and the optical loss IL(λ2) are good (Step S24). Further, an initial value of a parameter k is "1". Specifically, the control device 30 compares the optical loss IL(λ1) and the optical loss IL(λ2) with a predetermined determination threshold. In a case where the optical loss IL(λ1) is larger than the determination threshold, the control device 30 determines that the optical loss IL(λ1) is abnormal (Step S24; NO), and performs the cause analysis process (Step S25). Similarly, in a case where the optical loss IL(λ2) is larger than the determination threshold, the control device 30 determines that the optical loss IL(λ2) is abnormal (Step S24; NO), and performs the cause analysis process (Step S25).

In the cause analysis process of Step S25, as illustrated in FIG. 7, similarly to Step S151, first, the control device 30 reads the power P1(λ1) and the power P1(λ2) from the memory, and determines whether the testing light of each wavelength in the measurement device 20B is received on the basis of the power P1(λ1) and the power P1(λ2) (Step S251). In a case where it is determined that the testing light of at least one wavelength is received (Step S251; YES), the control device 30 compares the optical loss IL(λ1) with the optical loss IL(λ2) (Step S252).

For example, in a case where a result obtained by subtracting the optical loss IL(λ1) from the optical loss IL(λ2) is larger than the threshold for determining the bending (Step S252; YES), the control device 30 determines that at least one of optical fibers constituting the k-th optical fiber line fr is bent (Step S253). In the determination of Step S252, in a case where the result obtained by subtracting the optical loss IL(λ1) from the optical loss IL(λ2) is equal to or less that the threshold for determining the bending (Step S252; NO), the control device 30 determines that any loss other than the bending is generated in the optical fibers constituting the k-th optical fiber line fr (Step S254).

On the other hand, in a case where it is determined that no testing light of any wavelength is received (Step S251; NO) in the determination of Step S251, the control device 30 compares a distal-end distance D1 with a distal-end distance Dk (Step S255). The distal-end distance is a distance from one end to the other end of the optical fiber line fr, and is an optical path length of the optical fiber line fr. The distal-end distance D1 is a distal-end distance of the first optical fiber line fr. The distal-end distance Dk is a distal-end distance of the k-th optical fiber line fr. The control device 30 reads the measurement results of the optical pulse tester 42A with respect to the 1st and k-th optical fiber lines fr from the memory. Then, the control device 30 calculates the distal-end distance D1 and the distal-end distance Dk on the basis of the measurement results.

Herein, since the main measurement is performed in a case where the first optical fiber line fr is normal, no breakage occurs in the first optical fiber line fr. Therefore, in a case where the breakage occurs in the k-th optical fiber line fr, the distal-end distance Dk becomes smaller than the distal-end distance D1. Therefore, in a case where the distal-end distance D1 is larger than the distal-end distance Dk, it can be considered that the breakage occurs in the k-th optical fiber line fr. For example, in a case where a result obtained by subtracting the distal-end distance Dk from the distal-end distance D1 is larger than a threshold for determining the breakage (Step S255; YES), the control device 30 determines that the breakage occurs in the k-th optical fiber line fr (Step S256).

In a case where the result obtained by subtracting the distal-end distance Dk from the distal-end distance D1 is equal to or less than the threshold for determining the breakage (Step S255; NO) in the determination of Step S255, the control device 30 determines that the k-th optical fiber of the optical cable 4A is optically connected to an optical fiber other than the k-th optical fiber of the optical cable 4B (Step S257).

Then, the control device 30 outputs the abnormal cause which is determined in any of Steps S253, S254, S256, and S257 (Step S258). For example, the control device 30 may store information indicating the abnormal cause in the memory together with identification information specifying the optical fiber line fr, or may display the abnormal cause in the display device such as a display. Then, the control device 30 determines whether all the optical fiber lines fr are inspected (Step S27). In other words, the control device 30 determines whether a value of the parameter k is "N".

In the determination of Step S24, in a case where the optical loss IL($\lambda$1) is equal to or less than the determination threshold and the optical loss IL(22) is equal to or less than the determination threshold, the control device 30 determines that the optical loss IL($\lambda$1) and the optical loss IL($\lambda$2) are good (that is, the k-th optical fiber line fr is normal) (Step S24; YES), and outputs an inspection result of the k-th optical fiber line fr (Step S26). For example, the control device 30 may store the inspection result in the memory together with the identification information specifying the optical fiber line fr, and may display the inspection result to the display device such as a display. Then, the control device 30 determines whether all the optical fiber lines fr have been inspected (Step S27).

Then, in a case where it is determined that not all of the optical fiber lines fr have been inspected (Step S27; NO), the control device 30 increases by one the value of the parameter k (Step S28), and performs the processes again on Steps S24 to S27 on the next optical fiber line fr. On the other hand, in a case where it is determined that all the optical fiber lines fr are inspected in the determination of Step S27 (Step S27; YES), the control device 30 ends a series of processes of the measurement method which is performed by the measurement system 10. Note that the description has been given about the inspection on a portion including one optical cable 4A and the optical cable 4B corresponding to the optical cable 4A in the optical transmission lines R, and the above-described measurement method is performed sequentially even on the other optical cables 4A and 4B.

As described above, in the pre-measurement (Step S01), the measurement device 20A emits the testing light to the 1st optical fiber among the N optical fibers of the optical cable 4A, and the measurement device 20B measures an intensity of the testing light which is output from the 1st optical fiber among the N optical fibers of the optical cable 4B. Then, in a case where it is determined that no optical cable is misconnected in the pre-measurement, the main measurement is performed (Step S02).

In the main measurement, the measurement device 20A sequentially emits the testing light to each of the N optical fibers of the optical cable 4A, and the measurement device 20B sequentially measures the intensity of the testing light output from the optical fiber corresponding to the optical fiber of the optical cable 4A to which the testing light is emitted among the N optical fibers of the optical cable 4B. In addition, in the main measurement, the measurement device 20A sequentially emits the testing light to each of the N optical fibers of the optical cable 4A, and measures the temporal change of the intensity of the return light. In addition, the measurement device 20B sequentially emits the testing light to each of the N optical fibers of the optical cable 4B, and measures the temporal change of the intensity of the return light.

In a case where it is determined that there is a misconnection in the pre-measurement, the control device 30 performs the cause analysis process to analyze the abnormnal cause of the optical transmission line R on the basis of the measurement result (the power P1) of the power meter 41B (Step S15). In addition, in a case where it is determined that the optical fiber line fr is abnormal in the main measurement, the control device 30 performs the cause analysis process to analyze the abnormal cause of the optical fiber line fr (Step S25).

As described above, in the measurement system 10 and the measurement method, the misconnection of the optical cables (the optical cable 4A, the optical cable 5, and the optical cable 4B) constituting the optical transmission line R is inspected. In a case where it is determined that there is no misconnection, the N optical fiber lines fr are inspected. In a case where there is misconnection of an optical cable, it is necessary to correct the connection of the optical cable without the inspection of the N optical fiber lines fr. Therefore, in a case where it is determined that there is no misconnection, the inspection is performed on the N optical fiber lines fr. Therefore, it is possible to omit a redundant inspection. As a result, it is possible to improve an inspection efficiency of the optical transmission line R.

The misconnection of the optical cable can be determined by inspecting one optical fiber line fr. In the measurement system 10, it is determined whether the 1st optical fiber of the optical cable 4A and the 1st optical fiber of the optical cable 4B are optically and normally connected, so that the misconnection of the optical cable is inspected. Therefore, the pre-measurement can be simply performed, and the inspection efficiency of the optical transmission line R can be improved.

The optical cables 4A and 4B are ribbon fibers in which the N optical fibers are arranged in one direction. The 1st optical fiber of the optical cable 4A used in the pre-measurement is located at the end in one direction of the optical cable 4A, and the 1st optical fiber of the optical cable 4B used in the pre-measurement is located at the end in one direction of the optical cable 4B. When the ribbon fibers are connected to each other, the misconnection of the front and back ribbon fibers is easy to occur mostly. In this case, the misconnection can be determined by inspecting a combination of the optical fibers in a case where the optical cable 4A and the optical cable 4B are normally connected, and a combination of the optical fibers in a case where the optical cable 4A and the optical cable 4B are connected in reverse of the front and back sides. At this time, the optical fiber located at the end of the ribbon fiber is located at the end in a case where the ribbon fibers are normally connected and in a case where the ribbon fibers are connected in reverse of the front and back sides. Therefore, it is possible to most simply distinguish the misconnection by using optical fibers located at the end in one direction of the optical cables 4A and 4B.

The measurement devices 20A and 20B inspect the misconnection of the optical cable using the plurality of testing lights having different wavelengths in the pre-measurement (Step S01). For example, in a case where the optical fiber is bent, a bend loss becomes larger as the wavelength of the testing light is increased. In this way, the inspection accuracy may be different depending on the wavelength of the testing light. Therefore, it is possible to improve the inspection accuracy by performing inspection with the plurality of testing lights having different wavelengths.

In the main measurement (Step S02), the measurement device 20A sequentially emits the testing light to each of the N optical fibers of the optical cable 4A, and the measurement device 20B sequentially measures the intensity of the testing light output from the optical fiber corresponding to the optical fiber of the optical cable 4A to which the testing light is incident among the N optical fibers of the optical cable 4B. Therefore, it is possible to check each of the N optical fiber lines fr about whether the optical fiber is normally connected.

A length (a distal-end distance) (of an optically transmittable portion) of each optical fiber line fr can be measured in accordance with the temporal change of the intensity of the return light. For example, in a case where the measured length is shorter than the length of the normal optical fiber line fr, it is considered that breakage occurs in the optical fiber line fr. Therefore, it is possible to inspect an abnormality in each optical fiber line fr.

For example, in the pre-measurement (Step S01), in a case where the testing light is not received by the power meter 41B, there is a possibility that the optical cable is not normally connected. In addition, in the pre-measurement (Step S01), in a case where the testing light is received by the power meter 41B but the loss is large, it is considered that the optical cable is normally connected but an abnormality such as bending occurs in the optical cable. In this way, it is possible to simplify a repairing work of the optical transmission line R by analyzing the abnormal cause according to the measurement result of the power meter 41B.

Note that the measurement system and the measurement method according to the invention are not limited to the above embodiment.

For example, in the embodiment, the optical cable 4A and the optical cable 4B are optically connected by one optical cable 5 in the optical transmission line R. However, the optical cable 4A and the optical cable 4B may be optically connected by a plurality of optical cables 5 which are connected in series.

The optical cables 4A, 4B, and 5 just have to be a cable containing a plurality (N) of optical fibers, and may be not a ribbon fiber. In addition, the optical cables 4A, 4B, and 5 may contain optical fiber strands instead of the optical fibers.

In the embodiment, the optical pulse testers 42A and 42B are configured to include the light source. However, the optical pulse testers 42A and 42B and the light source may be configured separately. Alternatively, the measuring devices 24A and 24B may include another light source for measuring the power separated from the light sources of the optical pulse testers 42A and 42B.

In the embodiment, the measurement system 10 executes the measurement program to automatically inspect the optical transmission line R under the control of the control device 30. However, the measurement system 10 may perform the pre-measurement and the main measurement in response to the optical fiber line fr of the measurement target being designated by an operator using the input device of the control device 30.

The measurement of the optical loss IL and the OTDR measurement each may be performed using the testing light of one wavelength. In this case, it is possible to shorten an inspection time. In addition, the measurement of the optical loss IL and the OTDR measurement each may be performed using the testing light of three or more types of wavelengths (for example, a wavelength of 1,625 nm in addition of the above example). In this case, the inspection accuracy can be improved still more.

The OTDR measurement may be performed in the pre-measurement. In this case, it is possible to improve an estimation accuracy of the abnormal cause in the cause analysis process (Step S15). In addition, the OTDR measurement may be omitted from the main measurement. In this case, it is possible to shorten an inspection time.

In the pre-measurement, one optical fiber line fr may be inspected, and the optical fiber line fr inspected in the pre-measurement may be not the first optical fiber line fr.

In addition, in the measurement system 10, each threshold described above, the pulse width of the testing light, a condition of the OTDR measurement, and a range of the measurement distance may be set and changed. The setting and changing may be performed by the operator using the input device of the control device 30.

For example, in the OTDR measurement, a resolution may be improved by setting the pulse width small according to a situation. With this configuration, it is possible to improve the inspection accuracy.

In addition, in the embodiment, the optical loss Lswa of the optical switch 22A and the optical loss Lswb of the optical switch 22B are measured in advance, and registered in the memory. However, the optical loss Lswa and the optical loss Lswb may be low in reproducibility due to change over time and the like. Therefore, the measurement system 10 may have a function of automatically calibrating the optical loss Lswa of the optical switch 22A and the optical loss Lswb of the optical switch 22B. In an automatic calibration, whenever the measurement system 10 inspects the optical transmission line R, the optical pulse tester 42A measures the temporal change of the intensity of the return light before the pre-measurement (Step S01) to calculate the optical loss Lswa of the optical switch 22A, and the optical pulse tester 42B measures the temporal change of the intensity of the return light to calculate the optical loss Lswb of the optical switch 22B.

Figure 12:
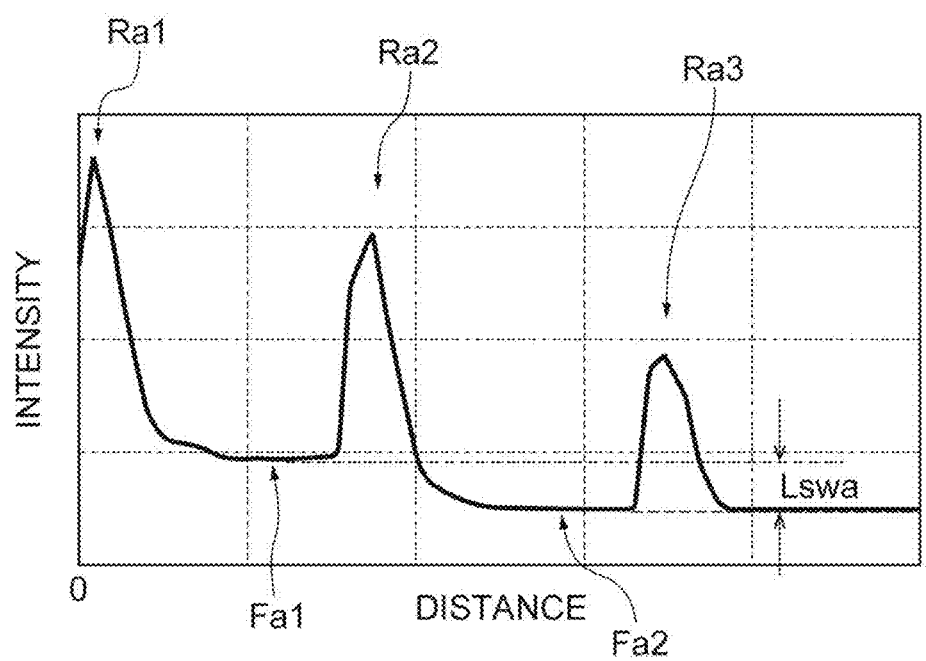
FIG. 12 is a diagram for describing an automatic calibration.
Figure 13:
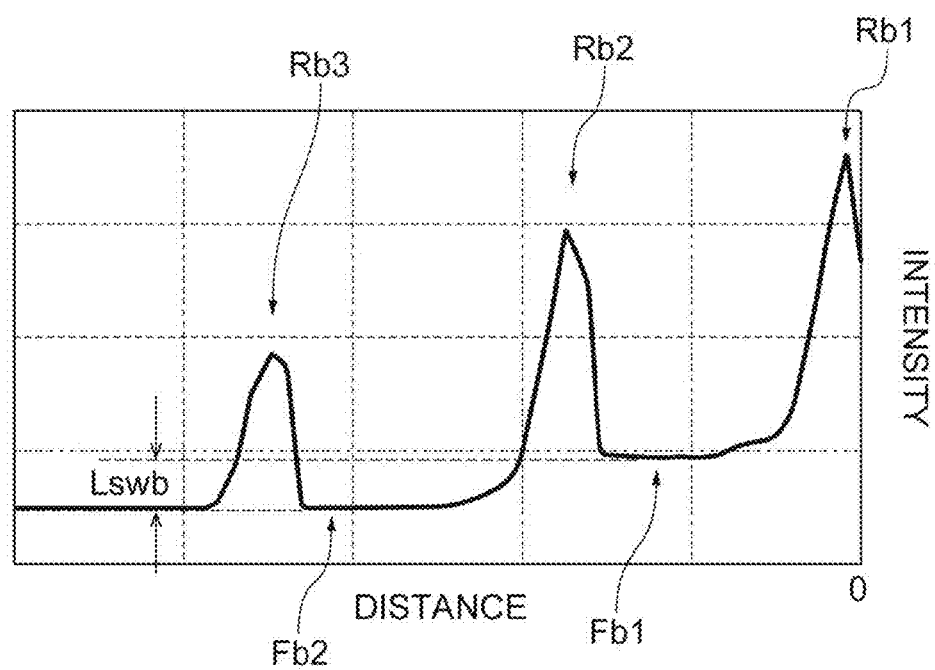
FIG. 13 is a diagram for describing the automatic calibration.

A function of the automatic calibration will be described with reference to FIGS. 12 and 13. FIGS. 12 and 13 are diagrams for describing the automatic calibration. The horizontal axis of FIG. 12 represents a distance from the optical pulse tester 42A, and the vertical axis of FIG. 12 represents the intensity of the return light. The horizontal axis of FIG. 13 represents a distance from the optical pulse tester 42B, and the vertical axis of FIG. 13 represents the intensity of the return light.

First, the calibration of the optical loss Lswa of the optical switch 22A will be described. The control device 30 transmits the switching instruction to the optical switch 22A such that the port connected to the optical pulse tester 42A and the port connected to the 1st optical fiber of the optical cable 4A are optically connected in the optical switch 22A. Then, the control device 30 causes the optical pulse tester 42A to output the testing light, and causes the optical pulse tester 42A to measure the temporal change of the intensity of the return light. Then, the control device 30 receives the measurement result measured by the optical pulse tester 42A, and calculates the optical loss Lswa.

Making an explanation in detail, as illustrated in FIG. 12, the measurement result includes protruding portions Ra1 to Ra3 and flat portions Fa1 and Fa2. The protruding portion Ra1 represents the intensity of reflected light caused by near-end reflection. The near-end reflection is a reflection occurring at a connection point between a connector of the optical cable connected to the optical pulse tester 42A and the optical pulse tester 42A. The protruding portion Ra2 represents an intensity of the reflected light generated in the optical switch 22A. The protruding portion Ra3 represents an intensity of the reflected light caused by the reflection occurring in the patch panel 2A. The flat portion Fa1 represents an intensity of the backscattering light in the optical cable which connects the optical pulse tester 42A and the optical switch 22A. The flat portion Fa2 represents an intensity of the backscattering light in the optical cable 27A which connects the optical switch 22A and the patch panel 2A.

In other words, a difference between the intensity of the flat portion Fa1 and the intensity of the flat portion Fa2 represents the optical loss Lswa in the optical switch 22A. Therefore, the control device 30 calculates the difference between the intensity of the flat portion Fat and the intensity of the flat portion Fa2, and sets the calculation result (difference) as the optical loss Lswa. Then, the control device 30 stores the calculated optical loss Lswa in the memory (not illustrated).

The calibration of the optical loss Lswb of the optical switch 22B are similarly performed. The control device 30 transmits the switching instruction to the optical switch 22B such that the port connected to the optical pulse tester 42B and the port connected to the 1st optical fiber of the optical cable 4B are optically connected in the optical switch 22B. Then, the control device 30 causes the optical pulse tester 42B to output the testing light, and causes the optical pulse tester 42B to measure the temporal change of the intensity of the return light. Then, the control device 30 receives the measurement result measured by the optical pulse tester 42B, and calculates the optical loss Lswb.

Making an explanation in detail, as illustrated in FIG. 13, the measurement result includes protruding portions Rb1 to Rb3 and flat portions Fb1 and Fb2. The protruding portion Rb1 represents an intensity of the reflected light caused by the near-end reflection occurring at a connection point between a connector of the optical cable connected to the optical pulse tester 42B and the optical pulse tester 42B. The protruding portion Rb2 represents an intensity of the reflected light caused by the reflection occurring in the optical switch 22B. The protruding portion Rb3 represents an intensity of the reflected light caused by the reflection occurring in the patch panel 2B. The flat portion Fb1 represents an intensity of the backscattering light in the optical cable which connects the optical pulse tester 42B and the optical switch 22B. The flat portion Fb2 represents an intensity of the backscattering light in the optical cable 27B which connects the optical switch 22B and the patch panel 2B.

In other words, a difference between the intensity of the flat portion Fb1 and the intensity of the flat portion Fb2 represents the optical loss Lswb in the optical switch 22B. Therefore, the control device 30 calculates the difference between the intensity of the flat portion Fb1 and the intensity of the flat portion Fb2, and sets the calculation result (difference) as the optical loss Lswb. Then, the control device 30 stores the calculated optical loss Lswb in the memory (not illustrated). Further, while the optical losses Lswa and Lswb are measured using the incident light from one direction in the above example, the measuring method of the optical losses Lswa and Lswb is not limited thereto. For example, it may be configured to cause the optical pulse tester 42A to perform the measurement up to the optical switch 22B, and cause the optical pulse tester 42B to perform measurement up to the optical switch 22A. In this case, the optical losses Lswa and Lswb may be measured from each incident direction. Therefore, an average value of the measured values from both sides may be used as the optical losses Lswa and Lswb, so that it is possible to reduce a measurement error still more.

In this way, whenever the measurement system 10 inspects the optical transmission line R, the temporal change of the intensity of the return light is measured, and the optical loss Lswa of the optical switch 22A and the optical loss Lswb of the optical switch 22B are calculated on the basis of the measurement result. Therefore, it is possible to reduce an error of the optical loss Lswa and the optical loss Lswb. With this configuration, the measurement accuracy of the optical loss IL of each optical fiber line fr can be improved.

The measurement system 10 may scan all the combinations of the optical fiber of the optical cable 4A and the optical fiber of the optical cable 4B constituting the optical fiber line fr determined as abnormal in a case where it is determined that two or more optical fiber lines fr are abnormal among the N optical fiber lines fr constituted by the optical cables 4A, 5, and 4B in the main measurement. Specifically, in a case where it is determined that all the optical fiber lines fr are inspected in the determination of Step S27 (Step S27; YES), the control device 30 may further perform an in-cable misconnection checking process illustrated in FIG. 14.

Figure 14:
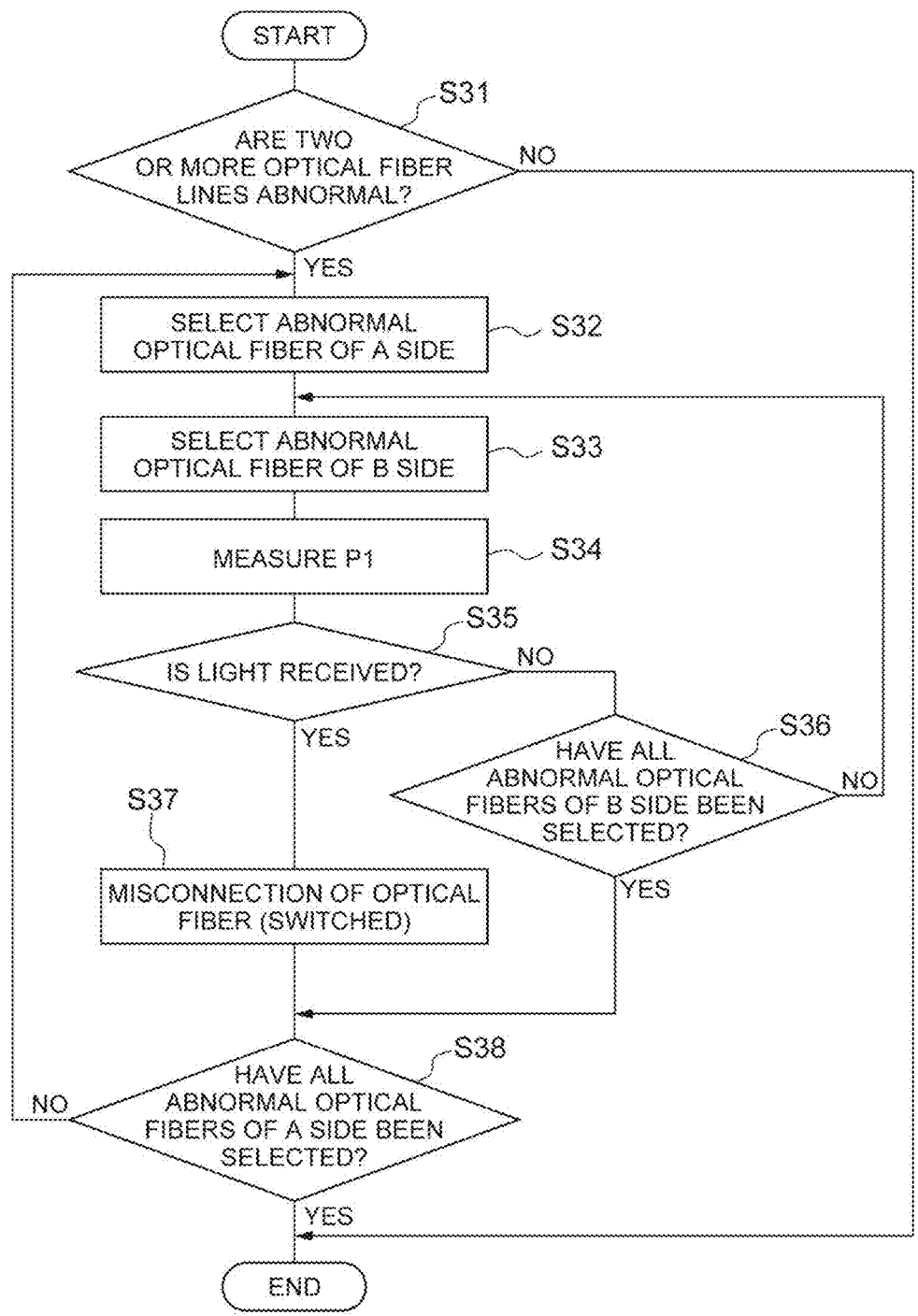
FIG. 14 is a flowchart illustrating an example of an in-cable misconnection checking process.

In the in-cable misconnection checking process illustrated in FIG. 14, first, the control device 30 determines whether it is determined that two or more optical fiber lines fr are abnormal among the N optical fiber lines fr configured by the optical cables 4A, 5, and 4B (Step S31). In a case where one or less optical fiber line fr is abnormal (Step S31; NO), the control device 30 ends the in-cable misconnection checking process. On the other hand, in a case where two or more optical fiber lines fr are abnormal in the determination of Step S31 (Step S31; YES), the control device 30 selects one optical fiber from the optical fibers of the optical cables 4A included in the abnormal optical fiber lines fr (Step S32). Then, the control device 30 selects one optical fiber from the optical fibers of the optical cable 4B included in the abnormal optical fiber lines fr (Step S33).

Then, the control device 30 transmits the switching instruction to the optical switch 22A such that the port connected to the optical pulse tester 42A and the port connected to the optical fiber of the optical cable 4A selected in Step S32 are optically connected in the optical switch 22A. Further, the control device 30 transmits the switching instruction to the optical switch 22B such that the port connected to the power meter 41B and the port connected to the optical fiber of the optical cable 4B selected in Step S33 are optically connected in the optical switch 22B. Then, the control device 30 causes the optical pulse tester 42A to output the testing light, and causes the power meter 41B to measure the power P1 (Step S34).

Then, the control device 30 determines whether the testing light is received in the measurement device 20B on the basis of the measured power P1 (Step S35). In a case where it is determined that the testing light is not received (Step S35; NO), the control device 30 determines whether all the optical fibers of the optical cable 4B included in the abnormal optical fiber lines fr have been selected (Step S36). In a case where it is determined that not all of the optical fibers have been selected (Step S36; NO), the control device 30 selects one unselected optical fiber among the optical fibers of the optical cable 4B included in the abnormal optical fiber lines fr (Step S33). Then, the processes of Steps S34 and S35 are performed again.

On the other hand, in a case where it is determined that the testing light is received in Step S35 (Step S35; YES), there is a strong possibility that the selected optical fibers are optically connected to each other. Therefore, in a case where it is determined that the testing light is received, the control device 30 determines that the optical fibers are misconnected (switched connection) (Step S37). Then, the control device 30 determines whether all the optical fibers of the optical cable 4A included in the abnormal optical fiber lines fr have been selected (Step S38). In addition, even in a case where it is determined that all the optical fibers have been selected in Step S36 (Step S36; YES), the control device 30 determines whether all the optical fibers of the optical cable 4A included in the abnormal optical fiber lines fr have been selected (Step S38).

In a case where it is determined that not all of the optical fibers have been selected (Step S38; NO), the control device 30 selects one unselected optical fiber among the optical fibers of the optical cable 4A included in the abnormal optical fiber lines fr (Step S32). Then, the processes of Steps S33 to S38 are performed again. On the other hand, in a case where the control device 30 determines that all the optical fibers have been selected in Step S38 (Step S38; YES), the in-cable misconnection checking process ends. With this configuration, it is possible to detect the misconnection of the optical fiber in the cable as an abnormal cause.

In a case where it is determined that two or more sets of the optical cables 4A, 5, and 4B are misconnected in the pre-measurement, the measurement system 10 may scan all the combinations of the optical cable 4A and the optical cable 4B of each set which is determined as misconnection. Specifically, the control device 30 may further perform an inter-cable misconnection checking process illustrated in FIG. 15.

Figure 15:
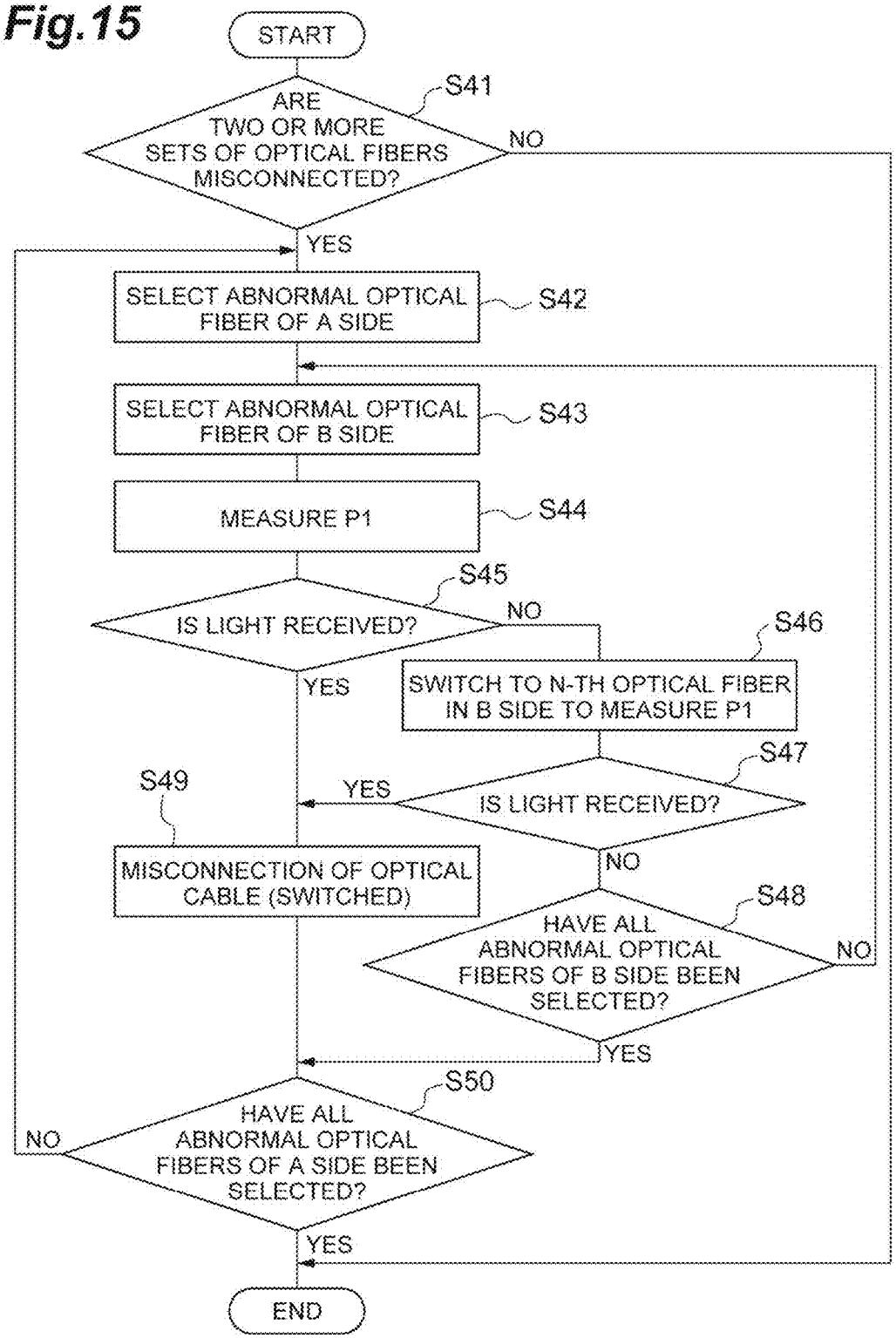
FIG. 15 is a flowchart illustrating an example of an inter-cable misconnection checking process.

In the inter-cable misconnection checking process illustrated in FIG. 15, first, the control device 30 determines whether there is a misconnection in two or more sets of the optical cables 4A, 5, and 4B among the plural sets of optical cables 4A, 5, and 4B included in the optical transmission line R (Step S41). In a case where it is determined that there is a misconnection in one or less sets of the optical cables 4A, 5, and 4B (Step S41; NO), the control device 30 ends the inter-cable misconnection checking process. On the other hand, in a case where it is determined that there is a misconnection in two or more sets of the optical cables 4A, 5, and 4B in the determination of Step S41 (Step S41; YES), the control device 30 selects one optical cable 4A from the abnormal optical cables 4A (Step S42). Note that the optical cable 4A and the optical cable 4B included in the optical cables 4A, 5, and 4B which are determined as misconnected will be called the abnormal optical cable 4A and the abnormal optical cable 4B respectively. Then, the control device 30 selects one optical cable 4B from the abnormal optical cables 4B (Step S43).

Then, the control device 30 transmits the switching instruction to the optical switch 22A such that the port connected to the optical pulse tester 42A and the port connected to the 1st optical fiber of the optical cable 4A selected in Step S42 are optically connected in the optical switch 22A. Further, the control device 30 transmits the switching instruction to the optical switch 22B such that the port connected to the power meter 41B and the port connected to the 1st optical fiber of the optical cable 4B selected in Step S43 are optically connected in the optical switch 22B. Then, the control device 30 causes the optical pulse tester 42A to output the testing light, and causes the power meter 41B to measure the power P1 (Step S44).

Then, the control device 30 determines whether the testing light is received in the measurement device 20B on the basis of the measured power P1 (Step S45). In a case where it is determined that the testing light is not received (Step S45; NO), the control device 30 transmits the switching instruction to the optical switch 22B such that the port connected to the power meter 41B and the port connected to the N-th (12th) optical fiber of the optical cable 4B selected in Step S43 are optically connected in the optical switch 22B. Then, the control device 30 causes the optical pulse tester 42A to output the testing light, and causes the power meter 41B to measure the power P1 (Step S46).

Then, the control device 30 determines whether the testing light is received in the measurement device 20B on the basis of the measured power P1 (Step S47). In a case where it is determined that the testing light is not received (Step S47; NO), the control device 30 determines whether all the abnormal optical cables 4B have been selected (Step S48). In a case where it is determined that not all of the abnormal optical cables 4B have been selected (Step S48; NO), the control device 30 selects one unselected optical cable 4B among the abnormal optical cables 4B (Step S43). Then, the processes after Step S44 are performed again.

On the other hand, in a case where it is determined that the testing light is received in Step S45 or S47 (Step S45; YES, Step S47; YES), there is a strong possibility that the selected optical cables are optically connected to each other. Therefore, in a case where it is determined that the testing light is received, the control device 30 determines that there is a misconnection (switched connection) of the optical cable (Step S49). Then, the control device 30 determines whether all the abnormal optical cables 4A have been selected (Step S50). In addition, even in a case where it is determined that all the abnormal optical cables 4B have been selected in Step S48 (Step S48; YES), the control device 30 determines whether all the abnormal optical cables 4A have been selected (Step S50).

In a case where it is determined that not all of the abnormal optical cables 4A have been selected (Step S50; NO), the control device 30 selects one unselected optical cable 4A among the abnormal optical cables 4A (Step S42). Then, the processes of Steps S43 to S50 are performed again. On the other hand, in a case where it is determined that all the abnormal optical cables 4A have been selected in Step S50 (Step S50; YES), the control device 30 ends the inter-cable misconnection checking process, With this configuration, it is possible to detect a misconnection between the cables as an abnormal cause.

(First Modification)

Figure 16:
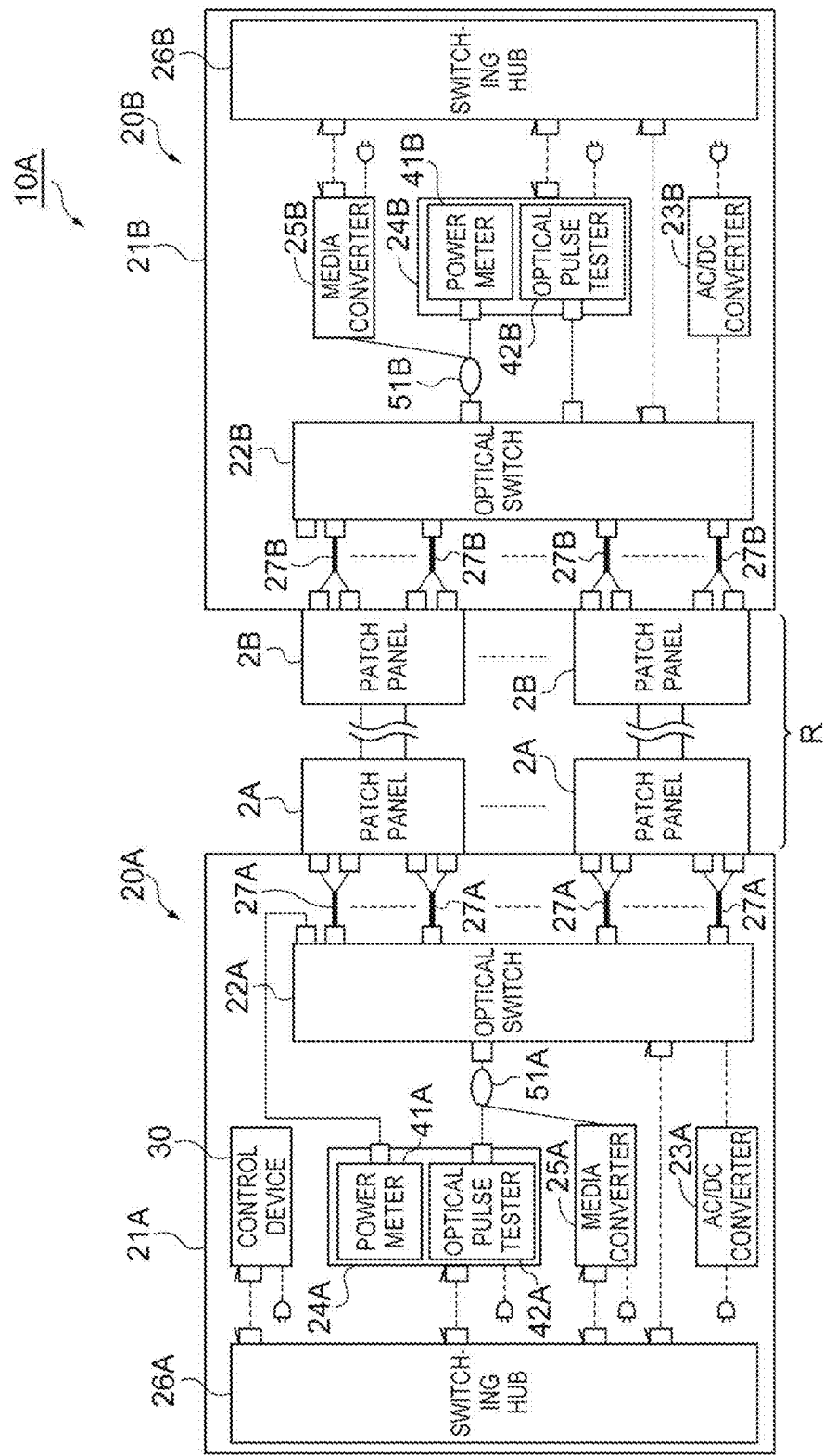
FIG. 16 is a diagram schematically illustrating a configuration of a measurement system according to a first modification.

FIG. 16 is a diagram schematically illustrating a configuration of a measurement system according to a first modification. A measurement system 10A illustrated in FIG. 16 is mainly different from the measurement system 10 in that the communication between the media converter 25A and the media converter 25B is performed through the optical switch 22A and the optical switch 22B.

Making an explanation in detail, the measurement device 20A of the measurement system 10A is mainly different from the measurement device 20A of the measurement system 10 in that a coupler 51A (first optical multiplexer/demultiplexer) is further included. The coupler 51A is provided between the optical switch 22A and the optical pulse tester 42A. The optical pulse tester 42A is optically connected to the optical switch 22A through the coupler 51A. The media converter 25A is optically connected to the optical switch 22A through the coupler 51A. The coupler 51A is a WDM (Wavelength Division Multiplexing) coupler, and is an optical distributor which combines or splits the lights having different wavelengths. The wavelength of the testing light output from the optical pulse tester 42A and the wavelength of a communication light for communication output from the media converter 25A are different from each other. The coupler 51A combines (multiplexes) the testing light output from the optical pulse tester 42A and the communication light for communication output from the media converter 25A, and outputs the combined light to the optical switch 22A. The coupler 51A splits the light output from the optical switch 22A into the return light and the communication light, outputs the return light to the optical pulse tester 42A, and outputs the communication light to the media converter 25A.

Similarly, the measurement device 20B of the measurement system 10A is mainly different from the measurement device 20B of the measurement system 10 in that a coupler 51B (second optical multiplexer/demultiplexer) is further included. The coupler 51B is provided between the optical switch 22B and the power meter 41B. The power meter 41B is optically connected to the optical switch 22B through the coupler 51B. The media converter 25B is optically connected to the optical switch 22B through the coupler 51B. The coupler 51B is a WDM coupler, and an optical distributor which combines or splits the light having different wavelengths. The coupler 51B outputs the communication light for communication output from the media converter 25B to the optical switch 22B. The coupler 51B splits the light output from the optical switch 22B into the testing light and the communication light, outputs the testing light to the power meter 41B, and outputs the communication light to the media converter 25B.

In the measurement system 10A, the first optical fiber line fr is used for the communication in an initial state. The initial state is a state where the operator connects the ports of the optical switch 22A and the internal adaptors of the plurality of patch panels 2A using the optical cables 27A, and connects the ports of the optical switch 22B and the internal adaptors of the plurality of patch panels 2B using the optical cables 27B. In other words, when the operator ends the connecting operation of the optical cables 27A and the optical cables 27B, the control device 30 transmits the switching instruction to the optical switch 22A such that the port connected to the optical pulse tester 42A and the media converter 25A and the port connected to the first optical fiber line fr are optically connected in the optical switch 22A, and transmits the switching instruction to the optical switch 22B such that the port connected to the optical pulse tester 42B and the media converter 25B and the port connected to the first optical fiber line fr are optically connected in the optical switch 22B.

Then, the control device 30 performs communication through the first optical fiber line fr to start the measurement method illustrated in FIG. 3. The optical fiber line fr of the measurement target and the optical fiber line fr used for the communication are the same. Therefore, if the optical fiber line fr of the measurement target is switched in the measurement method, the optical fiber line fr used for the communication is also switched, and thus the communication is temporally blocked. For example, in a case where breakage occurs in the switched optical fiber line fr, the communication is not possible to restart. Therefore, for example, as a countermeasure against communication blocking caused by the breakage or the like, the optical switch 22A and the optical switch 22B are configured to switch the connection to use the first optical fiber line fr in a case where a timeout error occurs in the communication. Specifically, when the optical switch 22A detects the timeout error, the optical switch 22A optically connects the port connected to the optical pulse tester 42A and the media converter 25A and the port connected to the first optical fiber line fr. Similarly, when the optical switch 22B detects the timeout error, the optical switch 22B optically connects the port connected to the optical pulse tester 42B and the media converter 25B and the port connected to the first optical fiber line fr.

As another countermeasure against the communication blocking, for example, the control device 30 may set a switching timing in the main measurement to the optical switch 22A and the optical switch 22B in advance. Then, the control device 30 may output a measurement start instruction to the optical switch 22A and the optical switch 22B so as to sequentially switch the optical fiber line of the measurement target from the first optical fiber line fr. In this case, even when the breakage occurs in the optical fiber line fr, the switching is kept on.

In addition, for example, in a case where the optical switch 22B and the media converter 25B are released from the connection in the OTDR measurement or the like, the optical switch 22B may determine whether a predetermined period of time elapses from the connection release, and the optical switch 22B and the media converter 25B may be connected again in response to the predetermined period of time elapsing. The predetermined period of time is set to the optical switch 22B in advance and, for example, is a period of time necessary for the OTDR measurement or the like.

Even in the measurement system 10A, the same effect as the measurement system 10 is achieved. In addition, there is no need for the measurement system 10A to provide a communication-dedicated optical fiber line in the optical transmission line R. Therefore, it is possible to effectively use the optical transmission line R.

(Second Modification)

Figure 17:
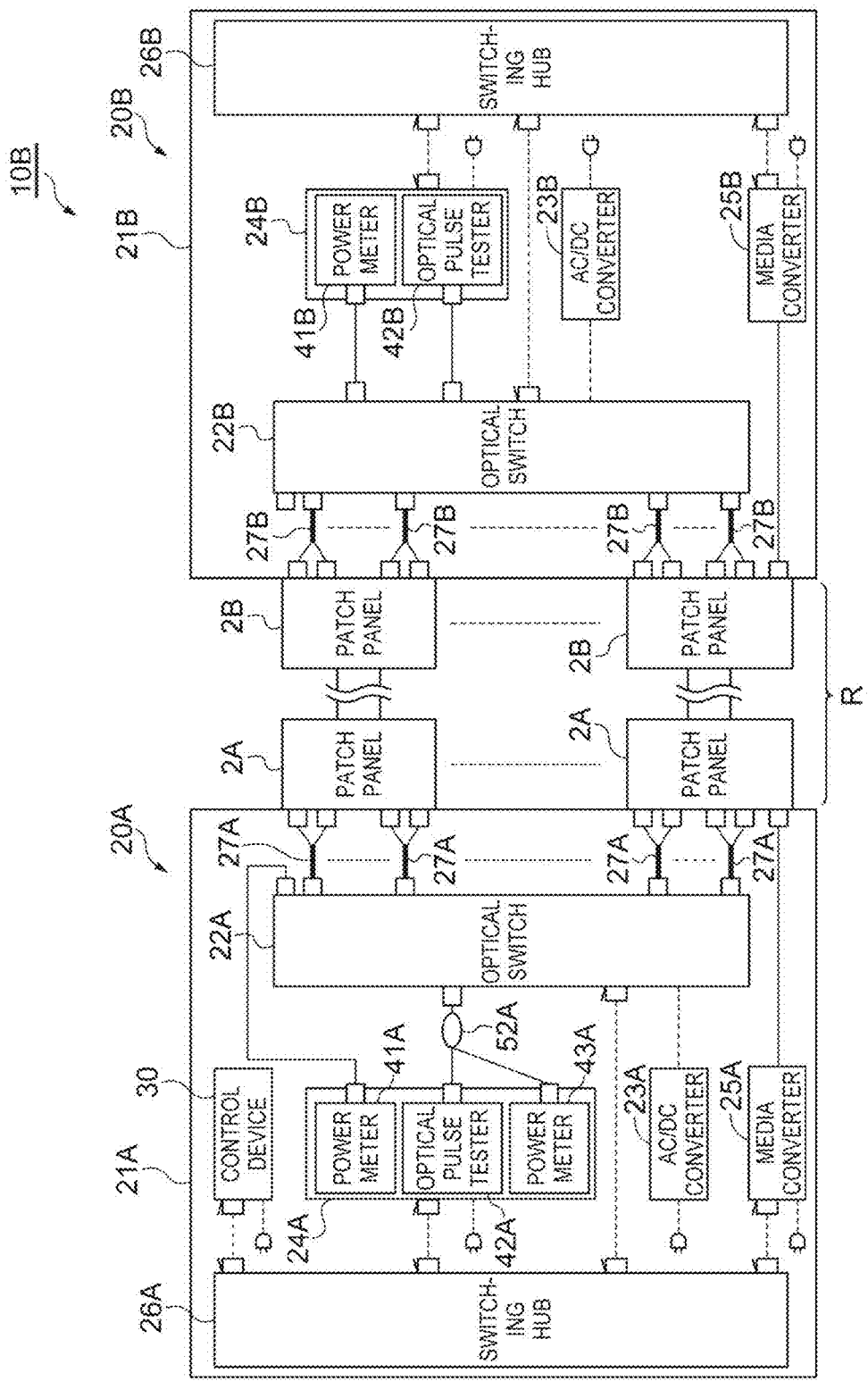
FIG. 17 is a diagram schematically illustrating a configuration of a measurement system according to a second modification.

FIG. 17 is a diagram schematically illustrating a configuration of a measurement system according to a second modification. A measurement system 10B illustrated in FIG. 17 is mainly different from the measurement system 10 in that a return loss is measurable.

Making an explanation in detail, the measurement device 20A of the measurement system 10B is mainly different from the measurement device 20A of the measurement system 10 in that a coupler 52A is further included, and the measuring device 24A further includes a power meter 43A (another power meter). The optical pulse tester 42A is optically connected to the optical switch 22A through the coupler 52A. The power meter 43A is optically connected to the optical switch 22A through the coupler 52A. The coupler 52A is provided between the optical switch 22A and the optical pulse tester 42A. The coupler 52A splits the return light, and outputs the split return lights to the optical pulse tester 42A and the power meter 43A. The power meter 43A is a device to measure the power (intensity) of light, and measures the intensity of the return light with respect to the testing light output from the light source of the optical pulse tester 42A. The return light is input to the power meter 43A through the optical switch 22A and the coupler 52A. The power meter 43A measures the intensity (power P2) of the return light on the basis of the measuring instruction which is output from the control device 30.

In the measurement system 10B, the control device 30 calculates a return loss RL of each optical fiber line fr in the main measurement instead of the OTDR measurement (Step S23). Specifically, the control device 30 transmits the switching instruction to the optical switch 22A such that the port connected to the optical pulse tester 42A and the port connected to the 1st optical fiber of the optical cable 4A are optically connected in the optical switch 22A, and transmits the switching instruction to the optical switch 22B such that the port connected to the 1st optical fiber of the optical cable 4B is not optically connected to any other port in the optical switch 22B. Then, the control device 30 causes the optical pulse tester 42A to output the testing light, and causes the power meter 43A to measure the power P2.

Then, the control device 30 receives the power P2 measured by the power meter 43A, and calculates the return loss RL of the optical fiber line fr using Formula (2). Herein, the optical loss Lref is a loss in the coupler 52A and the optical switch 22A. The optical loss Lswa is a loss in the coupler 52A, the optical switch 22A, and the optical cable 27A. The control device 30 repeatedly performs the process from the 1st optical fiber of the optical cable 4A to the N-th optical fiber sequentially. Further, the return loss RL may be measured using two testing lights having wavelengths different from each other (the wavelength λ1 and the wavelength λ2).

$$RL = P0 - P2 - 2 \times Lswa = Pref + Lref - P2 - 2 \times Lswa \quad (2)$$

Then, the control device 30 stores the power P2 and the return loss RL in association with the identification number of the optical fiber line fr in the memory (not illustrated). The control device 30 may analyze the abnormal cause using the return loss RL in the cause analysis process (Step S25).

Even in the measurement system 10B, the same effect as the measurement system 10 is achieved. In addition, the return loss of each optical fiber line fr is measured in the measurement system 10B. Therefore, it is possible to improve an analysis accuracy of the abnormal cause.

(Third Modification)

Figure 18:
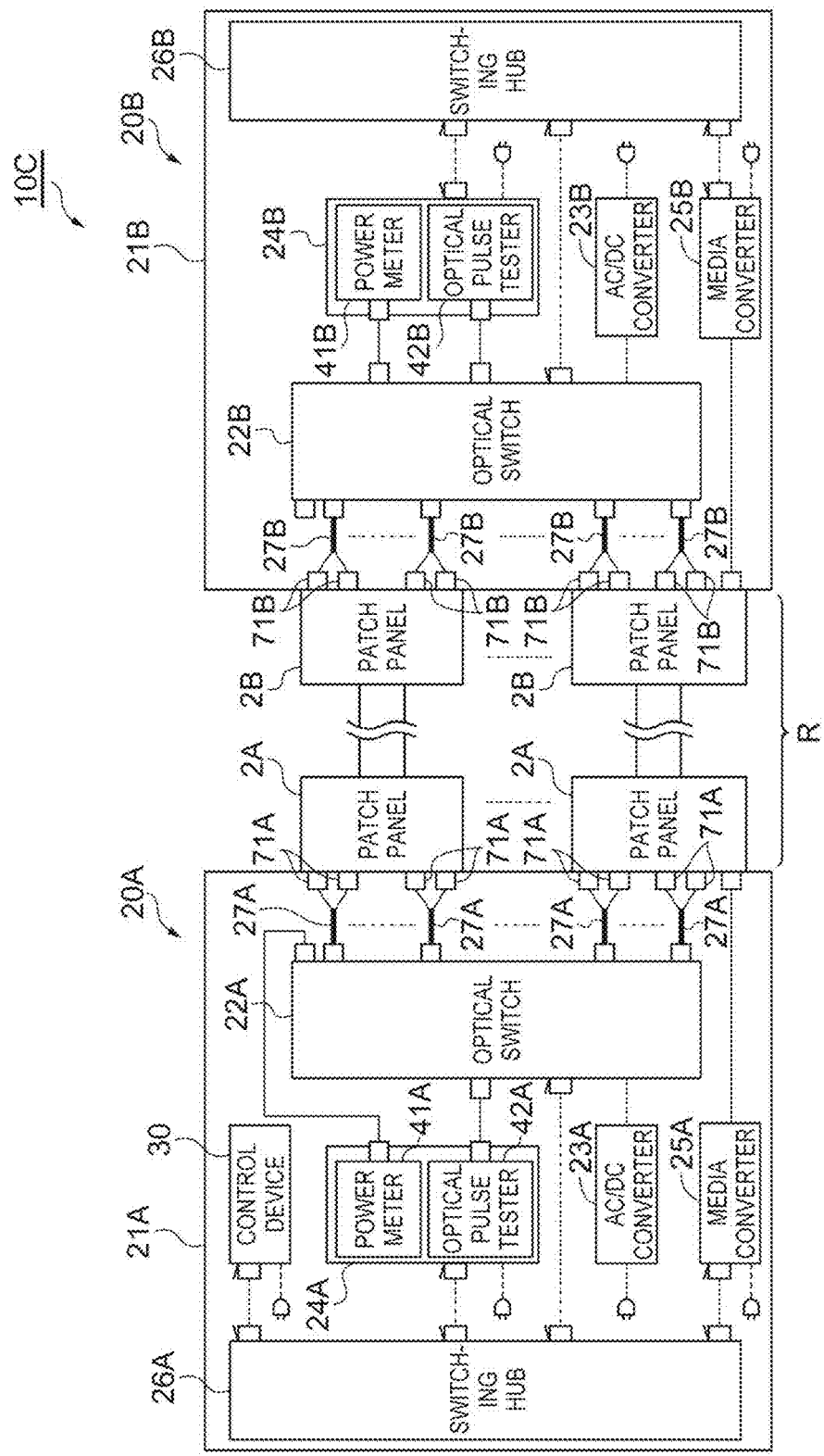
FIG. 18 is a diagram schematically illustrating a configuration of a measurement system according to a third modification.

FIG. 18 is a diagram schematically illustrating a configuration of a measurement system according to a third modification. A measurement system 10C illustrated in FIG. 18 is mainly different from the measurement system 10 in that an inspection progress and an inspection result can be displayed.

Making an explanation in detail, the measurement device 20A of the measurement system 10C is mainly different from the measurement device 20A of the measurement system 10 in that the optical cable 27A includes a connector 71A (a display unit, a first connector) as a simplex connector connected to the patch panel 2A. For example, the connector 71A has an LED (Light Emitting Diode) built therein which emits light with color according to an applied voltage. In this case, the optical cable 27A includes a wire to supply a voltage to the LED of the connector 71A.

Similarly, the measurement device 20B of the measurement system 10C is mainly different from the measurement device 20B of the measurement system 10 in that the optical cable 27B includes a connector 71B (a display unit, a second connector) as a simplex connector connected to the patch panel 2B. For example, the connector 71B has an LED built therein which emits light with color according to an applied voltage. In this case, the optical cable 27B includes a wire to supply a voltage to the LED of the connector 71B.

The control device 30 transmits the inspection result of the pre-measurement or the main measurement to the optical switch 22A and the optical switch 22B. The optical switch 22A causes the LED of the connector 71A to emit light according to the inspection result. The optical switch 22B causes the LED of the connector 71B to emit light according to the inspection result. For example, the optical switch 22A and the optical switch 22B cause the LED to emit light with color to identify whether the inspection result is normal or abnormal. The optical switch 22A and the optical switch 22B may cause the LED to emit light with color according to the abnormal cause. In addition, the optical switch 22A and the optical switch 22B may cause the LED to emit light according to a progress of the inspection. For example, the optical switch 22A and the optical switch 22B may flash the LEDs of the connector 71A and the connector 71B connected to the optical fiber line fr which is inspected. In other words, a plurality of the connectors 71A connected to a plurality of optical fibers of the optical cable 4A and a plurality of the connectors 71B connected to a plurality of optical fibers of the optical cable 4B constitute a display unit.

Even in the measurement system 10C, the same effect as the measurement system 10 is achieved. In addition, since the inspection result and the inspection progress can be notified to the operator in the measurement system 10C, it is possible to improve visibility of the inspection result and the inspection state. In addition, since the inspection result and the inspection progress are displayed by the light emitting of the connectors 71A and 71B, the operator can easily specify the abnormal optical fiber line fr. With this configuration, it is possible to improve the efficiency of the repairing work. Further, the control device 30 may display the inspection result and the inspection progress in a display device (display unit) such as a display instead of the LEDs of the connectors 71A and 71B.

(Fourth Modification)

Figure 19:
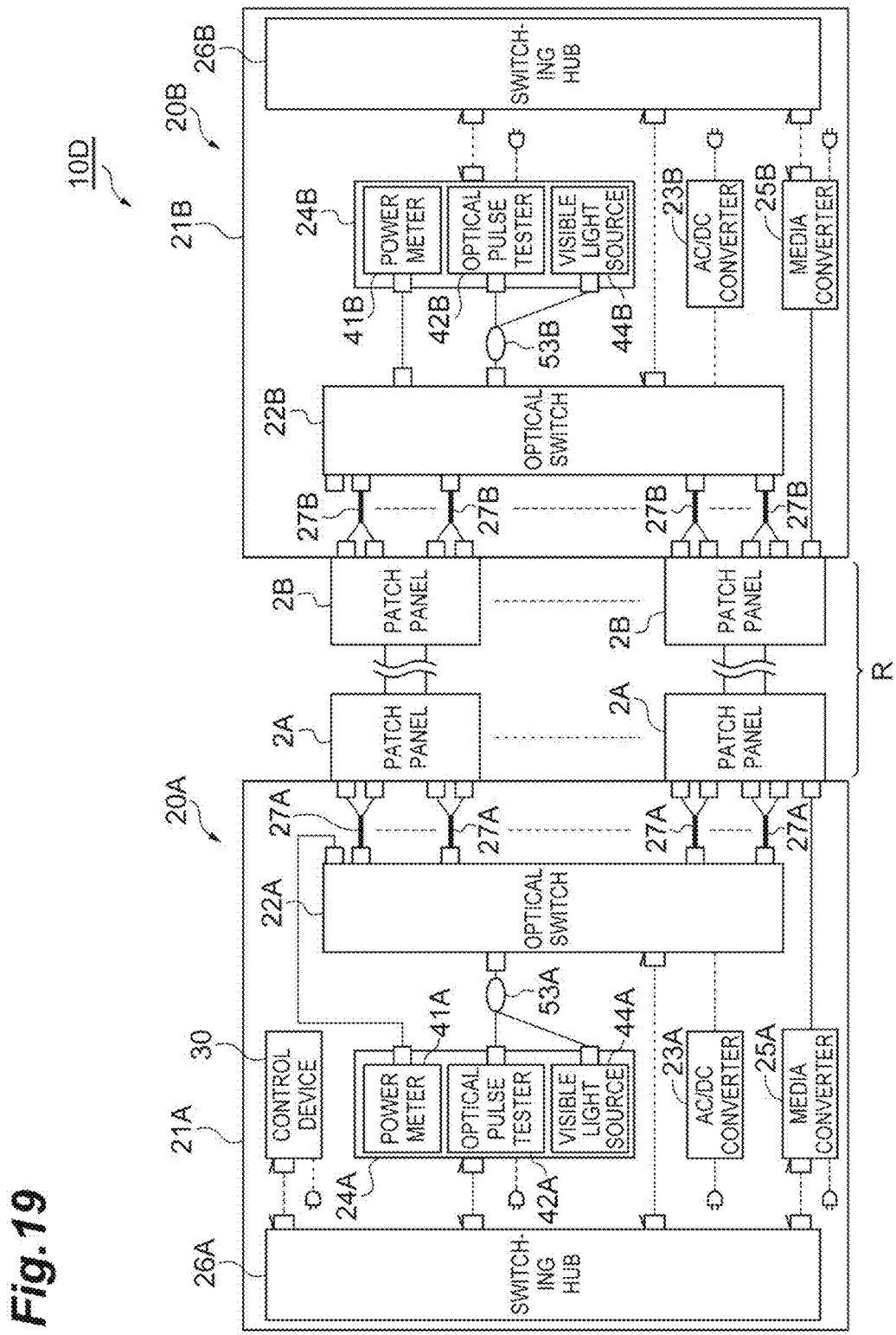
FIG. 19 is a diagram schematically illustrating a configuration of a measurement system according to a fourth modification.

FIG. 19 is a diagram schematically illustrating a configuration of a measurement system according to a fourth modification. A measurement system 10D illustrated in FIG. 19 is mainly different from the measurement system 10 in that an abnormal place is visible.

Making an explanation in detail, the measurement device 20A of the measurement system 10D is mainly different from the measurement device 20A of the measurement system 10 in that a coupler 53A is further included, and the measuring device 24A further includes a visible light source 44A. The optical pulse tester 42A is optically connected to the optical switch 22A through the coupler 53A. The visible light source 44A outputs a visible light. The visible light source 44A outputs the visible light on the basis of the light output instruction which is output from the control device 30. The visible light source 44A is optically connected to the optical switch 22A through the coupler 53A. The coupler 53A is a WDM coupler, and is an optical distributor which combines or splits the light having different wavelengths. The coupler 53A is provided between the optical switch 22A and the optical pulse tester 42A. The coupler 53A outputs the testing light output from the optical pulse tester 42A and the visible light output from the visible light source 44A to the optical switch 22A.

Similarly, the measurement device 20B of the measurement system 10D is mainly different from the measurement device 20B of the measurement system 10 in that a coupler 53B is further included, and the measuring device 24B further includes a visible light source 44B. The optical pulse tester 42B is optically connected to the optical switch 22B through the coupler 53B. The visible light source 44B outputs the visible light. The visible light source 44B outputs the visible light on the basis of the light output instruction which is output from the control device 30. The visible light source 44B is optically connected to the optical switch 22B through the coupler 53B. The coupler 53B is a WDM coupler, and is an optical distributor which combines and splits the light having different wavelengths. The coupler 53B is provided between the optical switch 22B and the optical pulse tester 42B. The coupler 53B outputs the testing light output from the optical pulse tester 42B and the visible light output from the visible light source 44B to the optical switch 22B.

In order to flash an abnormal place, the control device 30 causes the measurement device 20A and the measurement device 20B to output (emit) the visible light to the optical fiber line fr which is determined among the plurality of optical fiber lines fr as abnormal in the main measurement. Specifically, the control device 30 transmits the switching instruction to the optical switch 22A such that the port connected to the visible light source 44A and the port connected to the optical fiber line fr determined as abnormal are optically connected in the optical switch 22A, and transmits the switching instruction to the optical switch 22B such that the port connected to the visible light source 44B and the port connected to the optical fiber line fr determined as abnormal are optically connected in the optical switch 22B. Then, the control device 30 causes the visible light source 44A and the visible light source 44B to output the visible light. With this configuration, in a case where an abnormality such as breakage, bending, or fusion in axial deviation occurs in the optical fiber line fr, the visible light may leak out of the abnormal place to flash the abnormal place. Further, the control device 30 may cause any one of the visible light source 44A and the visible light source 44B to output the visible light.

Even in the measurement system 10D, the same effect as the measurement system 10 is achieved. In addition, since the visibility of the abnormal place can be increased in the measurement system 10D, it is possible to specify the abnormal place.

The light source of the optical pulse tester 42A and the light source of the optical pulse tester 42B may have a modulation function. For example, these light sources are configured to output a modulated light of 270 kHz. In this case, the control device 30 causes the optical pulse tester 42A to output the modulated light to the optical fiber line fr which is determined as abnormal in the main measurement. At this time, the operator bends a place of any one of the optical cable 4A, the optical cable 5, and the optical cable 4B, and detects the modulated light leaking from the bent portion using an optical fiber identifier. In a case where the modulated light is not detected, it may be estimated that breakage occurs between the bent portion and the optical pulse tester 42A.

Similarly, the control device 30 may cause the optical pulse tester 42B to output the modulated light to the optical fiber line fr which is determined as abnormal in the main measurement. At this time, the operator bends a place of any one of the optical cable 4A, the optical cable 5, and the optical cable 4B, and detects the modulated light leaking from the bent portion using an optical fiber identifier. In a case where the modulated light is not detected, it may be estimated that breakage occurs between the bent portion and the optical pulse tester 42B. Further, the control device 30 may cause the measurement device 20A and the measurement device 20B to output the modulated light to the optical fiber lines fr included in the optical cable 4A, the optical cable 5, and the optical cable 4B which are determined as misconnected in the pre-measurement. According to the above configuration, it is possible to specify an abnormal place.

What is claimed is:

1. A measurement system inspecting an optical transmission line configured by connecting a plurality of optical cables, each of which includes a plurality of optical fibers, wherein the optical transmission line includes a plurality of optical fiber lines configured by connecting the plurality of optical fibers in the plurality of optical cables, the measurement system comprising:
    a first measurement device configured to be disposed at a first end of the optical transmission line; and
    a second measurement device configured to be disposed at a second end of the optical transmission line,
    wherein the first measurement device and the second measurement device perform a first measurement to inspect whether the optical cable is misconnected, and a second measurement to inspect the plurality of optical fiber lines in a case where it is determined that there is no misconnection in the first measurement,
    wherein the first measurement device includes
        a first light source configured to output testing light, and
        a first optical switch configured to switch an optical fiber through which the testing light is incident among a plurality of optical fibers of a first optical cable located at the first end of the optical transmission line,
    wherein the second measurement device includes
        a power meter configured to measure an intensity of light, and
        a second optical switch configured to switch an optical fiber optically connected to the power meter among a plurality of optical fibers of a second optical cable located at the second end of the optical transmission line, and
    in the first measurement, the first measurement device emits the testing light to a first optical fiber among the plurality of optical fibers of the first optical cable, and the second measurement device measures an intensity of the testing light which is output from a second optical fiber corresponding to the first optical fiber among the plurality of optical fibers of the second optical cable.

2. The measurement system according to claim 1, wherein the first optical cable and the second optical cable each are a ribbon fiber in which the plurality of optical fibers are arranged in one direction,
    the first optical fiber is located at an end in the one direction of the first optical cable, and
    the second optical fiber is located at an end in the one direction of the second optical cable.

3. The measurement system according to claim 1, wherein the first light source is capable of outputting a plurality of testing lights having different wavelengths, and
    the first measurement device and the second measurement device inspect whether the optical cable is misconnected using the plurality of testing lights in the first measurement.

4. The measurement system according to claim 1, wherein, in the second measurement, the first measurement device sequentially emits the testing light to the plurality of optical fibers of the first optical cable, and the second measurement device sequentially measures an intensity of the testing light which is output from an optical fiber corresponding to the optical fiber through which the testing light of the first optical cable is incident among the plurality of optical fibers of the second optical cable.

5. The measurement system according to claim 1, wherein the first measurement device further includes a first tester to measure a temporal change of an intensity of first return light with respect to the testing light which is output from the first light source, and
    the second measurement device further includes a second light source to output the testing light, and a second tester to measure a temporal change of an intensity of second return light with respect to the testing light which is output from the second light source.

6. The measurement system according to claim 5, wherein, whenever the optical transmission line is inspected, the first tester measures the temporal change of the intensity of the first return light before the first measurement to calculate an insertion loss of the first optical switch, and the second tester measures the temporal change of the intensity of the second return light to calculate an insertion loss of the second optical switch.

7. The measurement system according to claim 1, further comprising:
an analysis unit configured to analyze an abnormal cause of the optical transmission line based on a measurement result of the power meter in a case where it is determined that there is misconnection in the first measurement.

8. The measurement system according to claim 1, wherein the first measurement device further includes a first optical multiplexer/demultiplexer which is provided between the first optical switch and the first light source, and a first communication device which is connected to the first optical switch through the first optical multiplexer/demultiplexer to communicate with the second measurement device, and
the second measurement device further includes a second optical multiplexer/demultiplexer which is provided between the second optical switch and the power meter, and a second communication device which is connected to the second optical switch through the second optical multiplexer/demultiplexer, and communicates with the first measurement device.

9. The measurement system according to claim 1, wherein the first measurement device further includes another power meter to measure an intensity of first return light with respect to the testing light which is output from the first light source.

10. The measurement system according to claim 1, wherein the first measurement device further includes a visible light source configured to output a visible light, and
the first measurement device emits the visible light to an optical fiber line which is determined as abnormal in the second measurement among the plurality of optical fiber lines.

11. The measurement system according to claim 1, further comprising,
a display unit configured to display an inspection result of the first measurement and the second measurement.

12. The measurement system according to claim 11, wherein the display unit includes a plurality of first connectors which are connected to the plurality of optical fibers of the first optical cable respectively, and a plurality of second connectors which are connected to the plurality of optical fibers of the second optical cable respectively, and
the plurality of first connectors and the plurality of second connectors each emit light to display the inspection result.

13. A measurement method of inspecting an optical transmission line configured by connecting a plurality of optical cables, each of which includes a plurality of optical fibers, wherein the optical transmission line includes a plurality of optical fiber lines configured by connecting the plurality of optical fibers in the plurality of optical cables, the measurement method comprising:
performing a first measurement to inspect whether the plurality of optical cables are misconnected by emitting testing light into a first optical fiber among the plurality of optical fibers in a first optical cable located at a first end of the optical transmission line and measuring an intensity of the testing light output from a second optical fiber corresponding to the first optical fiber among the plurality of optical fibers in a second optical cable located at a second end of the optical transmission line; and
performing a second measurement to inspect the plurality of optical fiber lines in a case where it is determined that there is no misconnection in the first measurement.

* * * * *